United States Patent
Jayaraman et al.

(10) Patent No.: US 10,074,245 B2
(45) Date of Patent: Sep. 11, 2018

(54) FORCE FEEL USING A BRUSHLESS DC MOTOR

(71) Applicant: Woodward, Inc., Fort Collins, CO (US)

(72) Inventors: Ganga P. Jayaraman, Buffalo Grove, IL (US); Michael L. Lyles, Skokie, IL (US); Zenon P. Szulyk, Mount Prospect, IL (US); Bryan R. Haack, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 47 days.

(21) Appl. No.: 15/402,497

(22) Filed: Jan. 10, 2017

(65) Prior Publication Data

US 2018/0197385 A1 Jul. 12, 2018

(51) Int. Cl.
| | |
|---|---|
| *B64C 13/46* | (2006.01) |
| *G08B 6/00* | (2006.01) |
| *H02P 6/14* | (2016.01) |
| *H02P 23/00* | (2016.01) |

(52) U.S. Cl.
CPC ............... *G08B 6/00* (2013.01); *H02P 6/14* (2013.01); *H02P 23/0004* (2013.01)

(58) Field of Classification Search
None
See application file for complete search history.

(56) References Cited

U.S. PATENT DOCUMENTS

| | | | |
|---|---|---|---|
| 4,988,273 | A | 1/1991 | Faig et al. |
| 5,384,527 | A | 1/1995 | Rozman et al. |
| 5,982,067 | A | 11/1999 | Sebastian et al. |

(Continued)

FOREIGN PATENT DOCUMENTS

| | | |
|---|---|---|
| EP | 2076432 B1 | 6/2012 |
| EP | 2490936 B1 | 6/2015 |

(Continued)

OTHER PUBLICATIONS

Akin et al., "Trapezoidal Control of BLDC Motors using Hall Effect Sensors," Texas Instruments, Apr. 2011, 34 pages.

(Continued)

*Primary Examiner* — Brent Swarthout
(74) *Attorney, Agent, or Firm* — Fish & Richardson P.C.

(57) ABSTRACT

The subject matter of this specification can be embodied in, among other things, a motion control apparatus that includes a brushless DC motor to actuate a mechanical output based on a collection of phase power signals, a collection of first Hall effect sensors configured to provide a collection of first feedback signals in response to a sensed motor position and a sensed motor speed, a controller configured to determine a speed and position of the motor based on the feedback signals, and determine an electrical current level based on a collection of operational parameters and feedback signals including a position of the mechanical output, the motor speed, and the motor position, a current controller configured to provide electrical phase sequence output signals based on the electrical current level, and a motor driver configured to provide the collection of phase power signals based on the electrical phase sequence output signals.

22 Claims, 20 Drawing Sheets

(56) References Cited

U.S. PATENT DOCUMENTS

| | | |
|---|---|---|
| 6,081,087 A | 6/2000 | Iijima et al. |
| 6,184,868 B1 | 2/2001 | Shahoian et al. |
| 6,342,880 B2 | 1/2002 | Rosenberg et al. |
| 6,407,254 B1 | 6/2002 | Riva et al. |
| 6,679,458 B2 | 1/2004 | Einthoven et al. |
| 6,850,022 B2 | 2/2005 | Liu et al. |
| 7,236,157 B2 | 6/2007 | Schena et al. |
| 7,400,103 B2 | 7/2008 | Hofer |
| 7,423,396 B2 | 9/2008 | Bolt |
| 7,750,593 B2 | 7/2010 | Tillotson |
| 7,759,894 B2 | 7/2010 | Marino et al. |
| 7,816,881 B2 | 10/2010 | Wiegers et al. |
| 7,885,785 B1 | 2/2011 | Pekarek et al. |
| 8,058,826 B2 | 11/2011 | Mock et al. |
| 8,594,864 B2 | 11/2013 | Greenfield et al. |
| 8,659,403 B2 | 2/2014 | Frayman |
| 8,660,748 B2 | 2/2014 | Springer et al. |
| 8,814,103 B2 | 8/2014 | Szulyk et al. |
| 9,102,400 B2 | 8/2015 | Cherepinsky |
| 9,239,345 B2 | 1/2016 | Liu et al. |
| 9,312,798 B2 | 4/2016 | Pike |
| 2007/0018598 A1 | 1/2007 | Nichols |
| 2008/0099629 A1* | 5/2008 | Abel ............... B64C 13/10 244/223 |
| 2008/0100252 A1 | 5/2008 | Tillotson |
| 2008/0147252 A1 | 6/2008 | Bayer |
| 2008/0156939 A1 | 7/2008 | Hanlon et al. |
| 2009/0125166 A1 | 5/2009 | Johnson et al. |
| 2009/0234518 A1 | 9/2009 | Irwin, III et al. |
| 2013/0099064 A1 | 4/2013 | Cherepinsky |
| 2013/0162418 A1* | 6/2013 | Frayman ............ B64C 13/10 340/407.2 |
| 2014/0288731 A1 | 9/2014 | Hagerott et al. |
| 2016/0304190 A1* | 10/2016 | Grohmann ......... B64C 13/46 |

FOREIGN PATENT DOCUMENTS

| | | |
|---|---|---|
| JP | 2004-194490 | 7/2004 |
| WO | WO2003/040844 | 5/2003 |
| WO | WO2009077414 A1 | 6/2009 |
| WO | WO2011/048399 | 4/2011 |

OTHER PUBLICATIONS

Honeywell, "How to Select Hall-Effect Sensors for Brushless DC Motors," Dec. 2012, 4 pages.

NXP, "BLDG Motor Control—Trapezoidal Back EMF BLDC Motor Control Techniques," Beyond Bits, Motor Control Edition, Copyright 2012, 4 pages.

International Search Report and Written Opinion of the International Searching Authority issued in International Application No. PCT/US2018/012316 dated Mar. 28, 2018, 13 pages.

\* cited by examiner

FORCE FEEL USING A BRUSHLESS DC MOTOR

TECHNICAL FIELD

This instant specification relates to mechanical input controls, and more particularly to tactile force feedback systems.

BACKGROUND

Force feedback is used primarily with position control systems wherein a force presented at an input control corresponds with the position of an actuated output. In these systems the forces adjacent to an endpoint on the arm being controlled are determined or sensed and corresponding scaled forces are applied to the input control to provide the operator with a tactile simulation of the forces on the endpoint based on the scaled forces which the operator works against to move the input control in order to position the actuated output at a desired position.

There are various methods to provide this tactile feedback and they are broadly classified as passive methods or active methods. Passive methods use passive mechanical components such as springs and dampers to generate the feedback forces. Active methods use an electric motor, electronics and software to generate the feedback forces.

Active methods, however, can be costly to implement. This is because the components of this system have to be very high quality to generate a force signal that is free of noise and other disturbances. Existing methods usually employ force sensors, precision gear-trains, electronic components of high accuracy, and a high bandwidth force control loop implemented in software. Additionally, for reasons of reliability and availability, the designer may be required to implement a minimum of a dual redundant system. These factors contribute to increasing the cost of the system.

SUMMARY

In general, this document describes tactile force feedback systems that use brushless DC motors.

In a first aspect, a motion control apparatus includes a brushless DC motor configured to actuate a mechanical output based on a collection of phase power signals, a collection of first Hall effect sensors configured to provide a collection of first feedback signals in response to a sensed motor position, a collection of second Hall effect sensors configured to provide a collection of second feedback signals in response to a sensed motor speed, a controller configured to (A) determine a motor speed and a motor position of the brushless DC motor based on the collection of feedback signals, and (B) determine an electrical current level based on a collection of operational parameters and feedback signals including a position of the mechanical output, the motor speed, and the motor position, a current controller configured to provide a collection of electrical phase sequence output signals based on the electrical current level, and a motor driver configured to provide the collection of phase power signals based on the collection of electrical phase sequence output signals.

Various embodiments can include some, all, or none of the following features. The control input signal can be a position feedback signal based on the position of an actuator driven by the mechanical output. The motion control apparatus can also include a clutch configured to controllably disconnect the mechanical output from the brushless DC motor. The motion control apparatus can also include a bias member configured to bias the mechanical output toward a predetermined position. The controller can be further configured to determine the electrical current level based on a cue control mode in which the electrical current level is controlled to provide haptic feedback at a mechanical control input that emulates one or more of a mechanical detent, a mechanical breakout, a spring bias, and a soft stop. The controller can be further configured to determine the electrical current level based on a trim control in which the electrical current level is controlled to move the control input member and actuate the motor. The controller can be a trapezoidal drive current controller including a block commutation logic module configured to determine a collection of motor phases of the motor to be excited based on the first feedback signals, and a proportional integral (PI) controller configured to regulate the amount of electrical current provided to the collection of motor phases. The controller can be a vector drive current controller including a motor position module configured to determine a position of the motor based on the sensed position and the sensed motor speed and the sensed motor position, a first coordinate transformation module that transforms electrical phase sequence output signals from a stationary frame of reference to a rotor frame of reference based on the first feedback signals, a proportional integral (PI) controller configured to determine a collection of motor phase voltages based on a collection of determined closed loop errors in motor currents in the rotor frame of reference, and a second coordinate transformation module configured to transfer the motor phase voltages to the three phase quantities in the stationary frame of reference based on the first feedback signals.

In a second aspect, a method for providing haptic feedback includes receiving a collection of feedback signals from a brushless DC motor and a control input signal based on a position of a control input member, and a feedback signal based on a position of the mechanical output, determining a motor speed and a motor position of the brushless DC motor, determining an electrical current level based on the control input signal, the motor speed, and the motor position, determining a collection of electrical phase sequence output signals based on the determined electrical current level, determining a collection of phase power signals based on the collection of electrical phase sequence output signals, and controlling the speed and position of a mechanical output of the brushless DC motor based on the collection of phase power output signals.

Various implementations can include some, all, or none of the following features. The control input signal can be a position feedback signal based on the position of an actuator driven by the mechanical output. The method can also include determining the electrical current level based on a cue control mode in which the electrical current level is controlled to provide haptic feedback at a mechanical control input that emulates one or more of a mechanical detent, a mechanical breakout, a spring bias, and a soft stop. The method can include determining the electrical current level based on a trim control in which the electrical current level is controlled to move the control input member and actuate the motor. The method can also include determining, by a block commutation logic module, a collection of motor phases of the motor to be excited based on the first feedback signals, and regulating, by a proportional integral (PI) controller, the amount of electrical current provided to the collection of motor phases. The method can also include determining, by a motor position module, a position of the motor based on the sensed position and the sensed motor speed and the sensed motor position, transforming, by a first coordinate transformation module, electrical phase sequence output signals from a stationary frame of reference to a rotor frame of reference based on the first feedback signals, determining, by a proportional integral (PI) controller, a collection of motor phase voltages based on a collection of determined closed loop errors in motor currents in the rotor frame of reference, and transferring, by a second coordinate transformation module, the motor phase voltages to the three phase quantities in the stationary frame of reference based on the first feedback signals.

In a third aspect, a motion controller includes a data processing apparatus, a collection of electrical inputs configured to receive a control input signal and a collection of Hall effect sensor feedback signals, an electrical output configured to provide an electrical current level, and a memory device storing instructions that when executed, cause the data processing apparatus to perform operations including receiving a collection of feedback signals from a brushless DC motor and a control input signal based on a position of a control input member, and a feedback signal based on a position of the mechanical output, determining a motor speed and a motor position of the brushless DC motor, determining an electrical current level based on the control input signal, the motor speed, and the motor position, determining a collection of electrical phase sequence output signals based on the determined electrical current level, determining a collection of phase power signals based on the collection of electrical phase sequence output signals, controlling the speed and position of a mechanical output of the brushless DC motor based on the collection of phase power output signals.

Various embodiments can include some, all, or none of the following features. The control input signal can be a position feedback signal based on the position of an actuator driven by the mechanical output. The motion controller can include a clutch configured to controllably disconnect the mechanical output from the brushless DC motor. The motion controller can include a bias member configured to bias the mechanical output toward a predetermined position. The controller can be further configured to determine the electrical current level based on a cue control mode in which the electrical current level is controlled to provide haptic feedback at a mechanical control input that emulates one or more of a mechanical detent, a mechanical breakout, a spring bias, and a soft stop. The controller can be further configured to determine the electrical current level based on a trim control in which the electrical current level is controlled to move the control input member and actuate the motor. The controller can be a trapezoidal drive current controller including a block commutation logic module configured to determine a collection of motor phases of the motor to be excited based on the first feedback signals, and a proportional integral (PI) controller configured to regulate the amount of electrical current provided to the collection of motor phases. The controller can be a vector drive current controller including a motor position module configured to determine a position of the motor based on the sensed position and the sensed motor speed and the sensed motor position, a first coordinate transformation module that transforms electrical phase sequence output signals from a stationary frame of reference to a rotor frame of reference based on the first feedback signals, a proportional integral (PI) controller configured to determine a collection of motor phase voltages based on a collection of determined closed loop errors in motor currents in the rotor frame of reference, and a second coordinate transformation module configured to transfer the motor phase voltages to the three phase quantities in the stationary frame of reference based on the first feedback signals.

The systems and techniques described here may provide one or more of the following advantages. First, a system can generate haptic feedback forces without using force sensors or a force control loop. Second, the system can provide haptic feedback without the implementation or cost of position resolvers for determination of motor position. Third, the system can provide haptic feedback without the implementation or cost of cogless motors with sinusoidal or field control methods. Fourth, the number of electronic components used to implement haptic feedback can be reduced. Fifth, the system can use brushless DC motors and vector control drive methods derive motor position at higher resolutions and reduce torque ripple generally associated with the use of block commutated drives.

The details of one or more implementations are set forth in the accompanying drawings and the description below. Other features and advantages will be apparent from the description and drawings, and from the claims.

DETAILED DESCRIPTION

This document describes systems and techniques providing a tactile cue trim actuator (TCTA) control system. In general, the systems described herein provide force and/or position feedback without the use of force sensors or a closed loop control of force. In general, the TCTA control system uses motor position, motor speed and actuator position information to provide feedback, but does not depend on the use of position resolvers for motor position which provides continuous motor position or cogless motors with sinusoidal or field oriented control methods. The use of such resolvers and field oriented control generally add extra costs to such previous systems. The TCTA control system uses Hall sensors to provide discrete motor position information, and uses a brushless direct current (DC) motor that is wound for a trapezoidal back-EMF.

Figure 1:
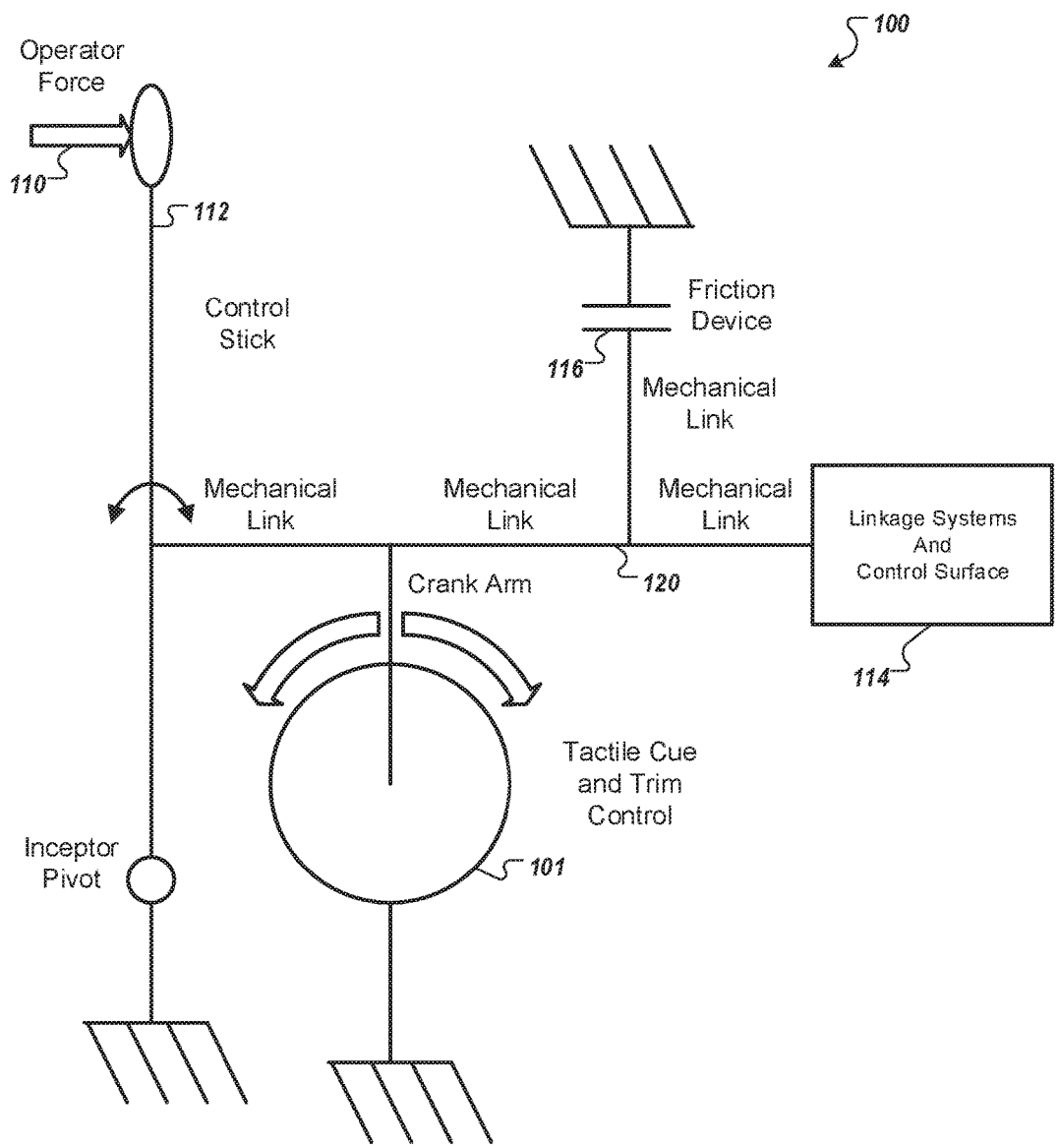
FIG. 1 is a diagram that shows a conceptual example of a hydromechanical flight control system having a tactile cue trim actuator.

FIG. 1 is a diagram that shows a conceptual example of a hydromechanical flight control system 100 having a TCTA 101. In general, an operator exerts a force 110 on a control stick 112 to move a flight control surface 114 through a linkage 120. In some embodiments, the linkage 120 can include hydraulic boosters to aid the operator, but such boosters may not be configured to provide tactile feedback to the operator that is indicative of the response of the control surface 114. TCTA 101 has a built in springs and dampers to provide some tactile feedback when it is not operating in a trim mode. During trim mode, the TCTA 101 automatically moves the control surface 114 as well as the control stick 112, in response to a trim speed command. When trim mode is active, the TCTA 101 is inactive.

When a tactile cueing function is active, the TCTA 101 provides a centering spring force and friction. In some embodiments, the TCTA 101 can also include a spring and/or damper to provide a backup or augmentative mechanical backup for tactile feedback. A passive mechanical friction device 116 is connected to the linkage 120 to provide friction.

Figure 2:
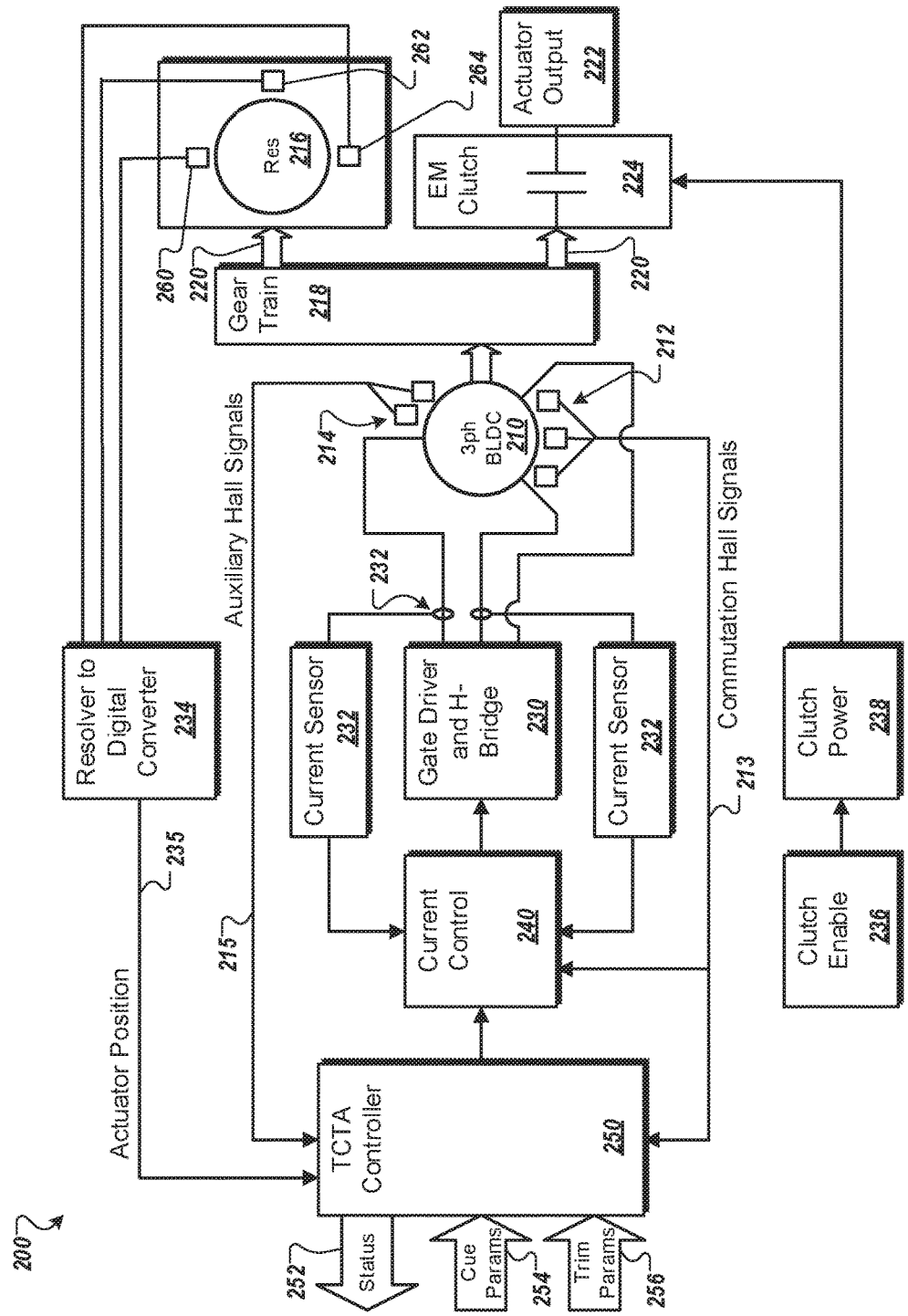
FIG. 2 is a system level block diagram of an example tactile cue trim actuator control system.

FIG. 2 is a system level block diagram of an example tactile cue trim actuator control system 200. In some implementations, the TCTA 200 can be the example TCTA 101 of FIG. 1. The TCTA 200 includes mechanical, electronic, and software subsystems.

The mechanical subsystem includes a motor 210 (e.g., a brushless DC motor), a collection of commutation Hall sensors 212, a collection of auxiliary Hall sensors 214, an output position resolver 216, and a gear train 218. The position resolver 216 is configured to sense a position of an actuator shaft 220 of the gear train 218, but in some embodiments the position resolver 216 may be converted based on linkage geometry to sense a position of a control input member, such as the control stick 112 shown in FIG. 1. The gear train 218 also drives an actuator output 222 or other mechanical output through an electromagnetic (EM) clutch 224.

The motor 210 is a brushless direct current (BLDC) motor which has its windings distributed to provide a sinusoidal or a trapezoidal back-EMF waveform. In some embodiments, a sinusoidal distribution can result in a smaller cogging torque. Permanent magnets on a rotor of the motor 210 provide a magnetizing flux, and in some embodiments the number of poles can range from about two to about eight. A set of three discrete Hall sensors of the collection of commutation Hall sensors 212 are placed approximately 120 electrical degrees apart to sense phase excitation timing, or commutation, information. When the rotor magnet passes over one of these three Hall sensors 212, it causes the sensors to switch states. The sensor states are provided as a collection of commutation Hall sensor signals 213. Two discrete Hall sensors of the collection of auxiliary Hall sensors 214 are mounted at a short angular distance apart. There are correspondingly a relatively large number of permanent magnets on the rotor. As an example, there could be 36 or more poles on the rotor for the collection of auxiliary Hall sensors 214. An auxiliary Hall sensor 214 turns on and off whenever one of the magnet poles passes over it. These sensor states are provided as a collection of auxiliary Hall sensor signals 215.

Torque provided by the motor 210 is amplified by the gear-train 218. The output of the gear-train 218 goes to the EM clutch 224. The EM clutch 224 is used to disengage the gear-train 218 from the actuator output 222 in the event of a jam in the gear-train 218, or when the trim or tactile cue function needs to be disabled. For example, applying a current to a solenoid can cause the EM clutch 224 to engage and removing the current to the solenoid can disengage the EM clutch 224 allowing the actuator output to move freely. In some embodiments, the position resolver 216 can be mounted to the actuator shaft 220 using an auxiliary gear-train.

The position resolver receives alternating current (AC) excitation to an excitation winding 260 on its stator (not shown) at a high frequency from the resolver to digital converter 234. The current from the excitation signal generates a magnetic flux that is linked to a sine winding 262 and a cosine winding 264 also on the resolver stator through a magnetically permeable rotor. The amount of flux linked is proportional to the angular position of the rotor. The sine and cosine windings 262, 264 output a voltage that is proportional to the sine and cosine of the angular position of the resolver 216, and indirectly, the position of the actuator. The resolver to digital converter 234 demodulates the sine and cosine outputs from the resolver 216 and determines the angular position of the actuator shaft 220, which is provided as an actuator position feedback signal 235.

The drive electronics subsystem (e.g., a motor driver) includes a power stage H-bridge 230 with its gate drivers configured to provide a collection of phase power signals to the motor 210. The drive electronics subsystem also includes a collection of current sensors 232, and a resolver to digital converter 234. The EM clutch 224 is activated by a clutch power module 238 which triggers in response to a clutch enable signal 236.

The software subsystem includes the algorithms used to implement a current control loop in a current controller 240, a current reference command generator or a position loop, and drivers needed to interface with the Hall sensors 212, 214 and the external operator interface. In some implementations, the software subsystem executes in a microcontroller, digital signal, processor (DSP), a field programmable gate array (FPGA) device, or any other appropriate type of processor based on, for example, the application requirements. This processor device is not shown explicitly in the figure.

A TCTA controller 250 interfaces with the operator through a data link and an operator interface (e.g., an input member, the control stick 112 of FIG. 1) that is external to the TCTA 200, (e.g., part of an aircraft's avionics systems). The TCTA controller 250 provides operational status information 252, accepts cue command and parameter information 254, accepts trim command and parameter information 256, accepts emergency disable commands (not represented in the figure), and function or mode enable discrete commands (also not represented in the figure).

The operator can put the TCTA 200 into a trim mode or a tactile cueing mode through a discrete command. When the TCTA 200 is in trim mode, the TCTA controller 250 accepts and responds to the trim speed commands and parameters 256. This is done as follows.

The auxiliary Hall sensors 214 are used to determine the speed of the motor 210, and the determined speed is used as feedback in a closed loop speed control system. In some implementations a position feedback signal can be used, as will be discussed further in the description of FIG. 12. The output of the speed control system is a current command to the current controller 240. The current controller 240 uses a proportional integral (PI) controller to regulate current, and output a voltage duty ratio to the gate drivers. The commutation Hall sensors 212 are used to sense the excitation sequence, and information about the sensed excitation sequence is combined with a duty ratio command to generate the gate drive signals to the H-Bridge 230. The motor current causes the motor 210 to provide resistive torque at the actuator output 222, as well as the operator input.

When the TCTA controller 250 is in the tactile cueing mode, it accepts the cueing commands and parameters 254. The position resolver 216 on the actuator shaft 220 is used to implement a closed position control loop in which the position command is a target cue position. Note that in the examples described herein, the actuator position is for all practical purposes analogous or proportional to the operator input (e.g., control stick, operator inceptor) position, and the actuator speed is analogous or proportional to the operator input angular speed. In some embodiments, the linkage can be designed to achieve this relationship. The position control loop generates a current command in proportion to the resistive force required at the operator input.

For this purpose, the TCTA controller 250 uses characteristic maps that define spring force as a function of control stick position, and define damping torque as a function of control stick angular speed. The current command is sent to the current controller. The maps are discussed further in the descriptions of FIGS. 13-15. The following figures describe each of the subsystem in greater detail.

Figure 3:
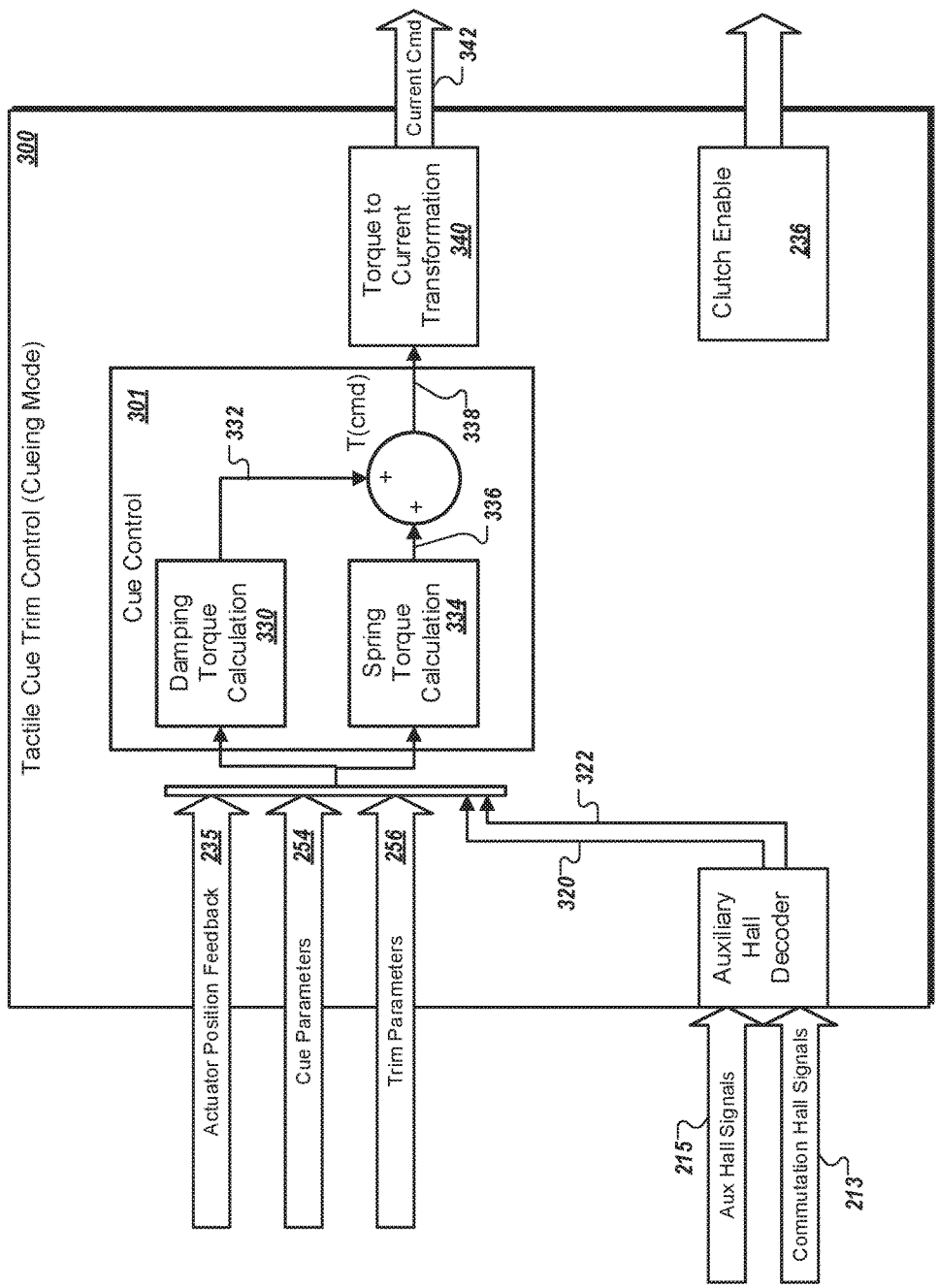
FIG. 3 is a block diagram of example functional blocks of an example tactile cue trim actuator control system.

FIG. 3 is a block diagram of example functional blocks of an example TCTA controller 300. In some implementations, the TCTA controller 300 can be the example TCTA controller 250 of FIG. 2.

The input to TCTA controller 300 includes the actuator position feedback signal 235 (e.g., from the resolver to digital converter 216), the collection of cue commands and parameters 254 from the operator interface, the collection of trim commands and parameters 256 from the operator interface, an actuator speed feedback signal 320 and a motor position feedback signal 322 provided by an auxiliary Hall decoder 324. The actuator speed feedback signal 320 and the motor position feedback signal 322 are based on the collection of commutation Hall sensor signals 213 and the collection of auxiliary Hall sensor signals 215 (e.g., provided by the commutation Hall sensors 212 and the auxiliary Hall sensors 214.

The actuator speed feedback signal 320 and the motor position feedback signal 322 are provided to a cue control module 301. A damping torque calculation module 330 processes the motor position feedback signal 322 to determine a damping torque component 332 of a torque command 338. A spring torque calculation module 334 processes the actuator speed feedback signal 320 to determine a spring torque component 336 of the torque command 338.

A torque to current transformation module 340 generates a motor current command 342 that is provided to a current controller (e.g., the current control module 240). This subsystem also generates the clutch enable signal 236 (e.g., used to engage or disengage the EM clutch 224 to the actuator shaft 220).

Figure 4:
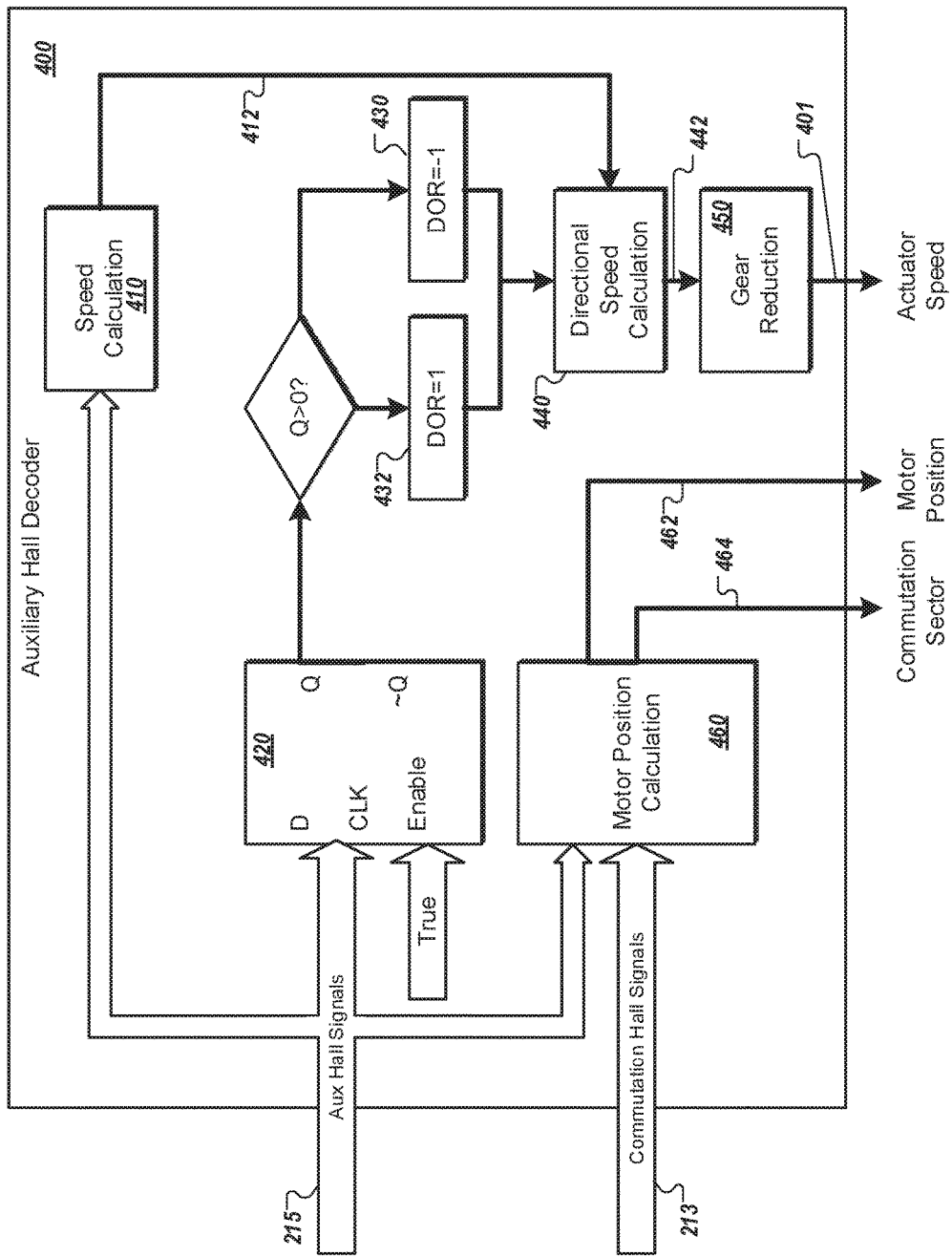
FIG. 4 is a block diagram of an example auxiliary Hall sensor decoder of the example tactile cue trim actuator control system.

FIG. 4 is a block diagram of an example auxiliary Hall sensor decoder 400. In some implementations, the auxiliary Hall sensor decoder 400 can be included in the example TCTA controller 250 of FIG. 2. In general, the auxiliary Hall sensor decoder 400 determines an actuator speed and direction 401 based on the collection of auxiliary Hall sensor signals 215.

The collection of auxiliary Hall sensors 214 switch on and off in response to a magnet pole passing over them. These transitions take the form of a squared wave for each sensor, with one of the auxiliary Hall sensors 214 being 90 electrical degrees phase-delayed from another of the auxiliary Hall sensors 214. A speed calculation block 410 measures the time duration between transitions and uses these measurements to estimate a speed magnitude value 412. The direction of rotation is determined by determining which of the collection of auxiliary Hall sensors 214 is lagging in phase to the other. This logic is encoded in a flip-flop block 420 which may be implemented in hardware or software. One direction of rotation 430 is assigned the negative sign, while the other direction of rotation 432 is assigned the positive sign. A directional speed calculation module 440 multiplies the sign 430, 432, the speed magnitude value 412, and an actuator gear ratio to estimate an actuator speed 442. A motor position module 460 estimates a motor position value 462 by combining a commutation sector value 464 determined by using the collection of commutation Hall sensor signals 213 and the position calculated from the collection of auxiliary Hall sensor signals 215. In general, each commutation Hall transition starts a new sector which serves as a reference point with respect to which the position is calculated by summing incremental positions corresponding to each auxiliary Hall transition.

Figure 5:
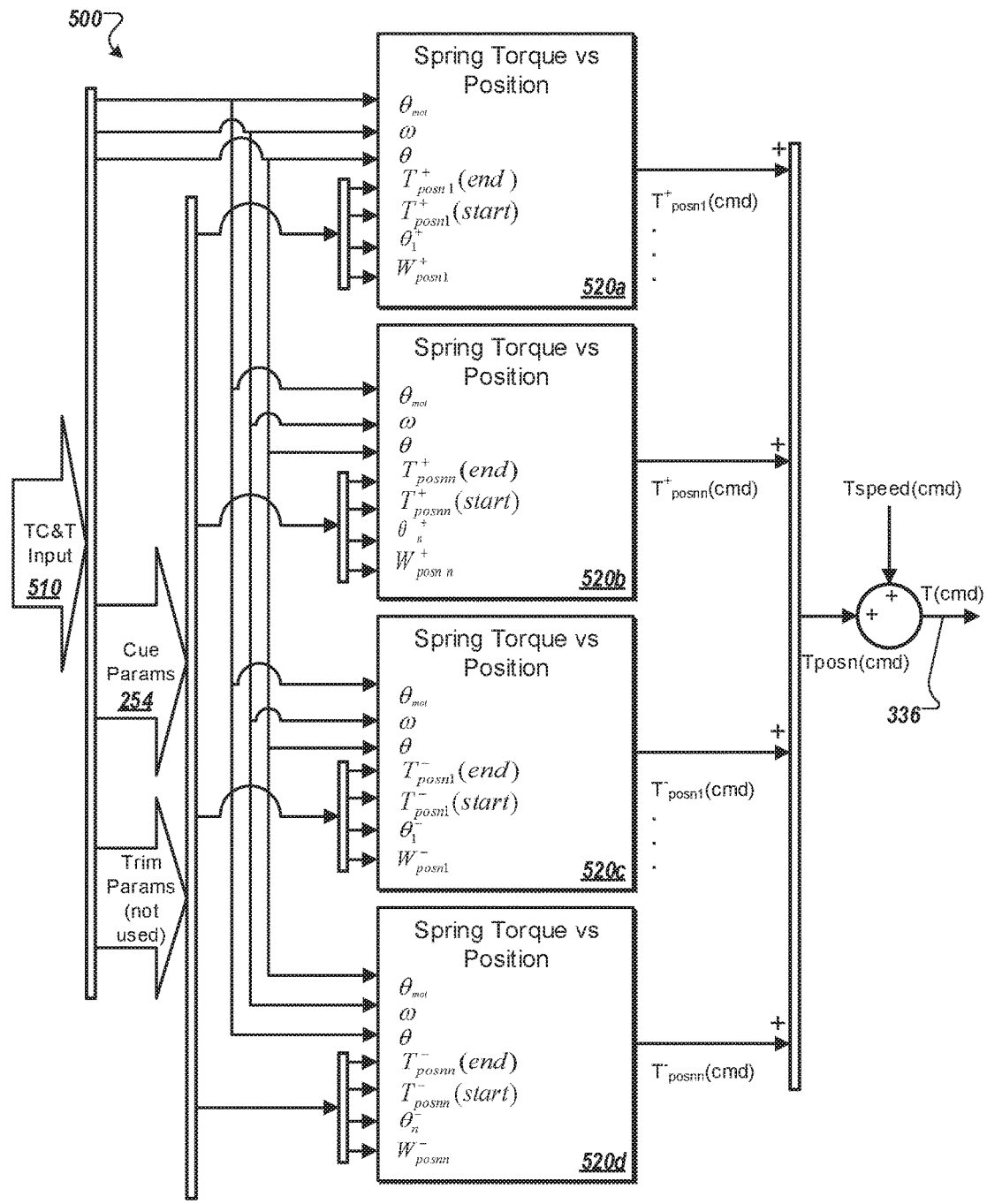
FIG. 5 is a block diagram of an example cue control position module of the example tactile cue trim actuator control system.

FIG. 5 is a block diagram of an example cue control position module 500. In some implementations, the cue control position module 500 can be included in the example TCTA controller 250 of FIG. 2. In general, FIG. 5 shows the functional blocks used in estimating an electrical current that corresponds to a position-dependent spring force component of the cue commands and parameters 254. A tactile cue and trim control input 510 is used by a collection of functional blocks 520a-520d to determine a component of the spring torque value 336. Each of the blocks 520a-520d corresponds to a feature in the Torque vs Position characteristic shown in FIG. 13 and FIG. 14.

Figure 6:
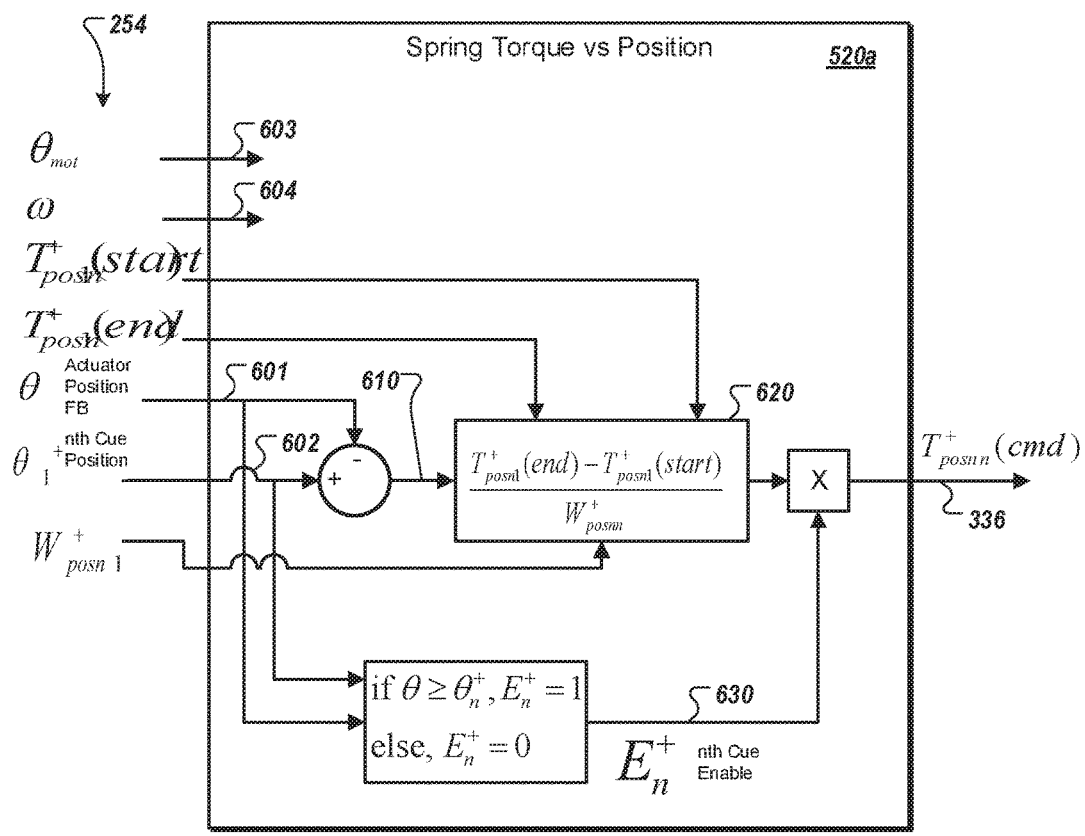
FIG. 6 shows additional detail of a spring torque vs position functional block.

FIG. 6 shows detail of an example spring torque vs position functional block 600. In some examples, the block 600 can be any of the functional blocks 520a-520d of FIG. 5. In this example, a motor position 603 and actuator speed 604 are not used. A position loop gain is calculated based on default values for the cue parameters 254, or values provided by the operator. A position loop error 610 is determined by taking the difference between an actuator position 601 and a cue position 602 and multiplying the difference by a position loop gain determined by a position loop gain block 620.

Figure 13:
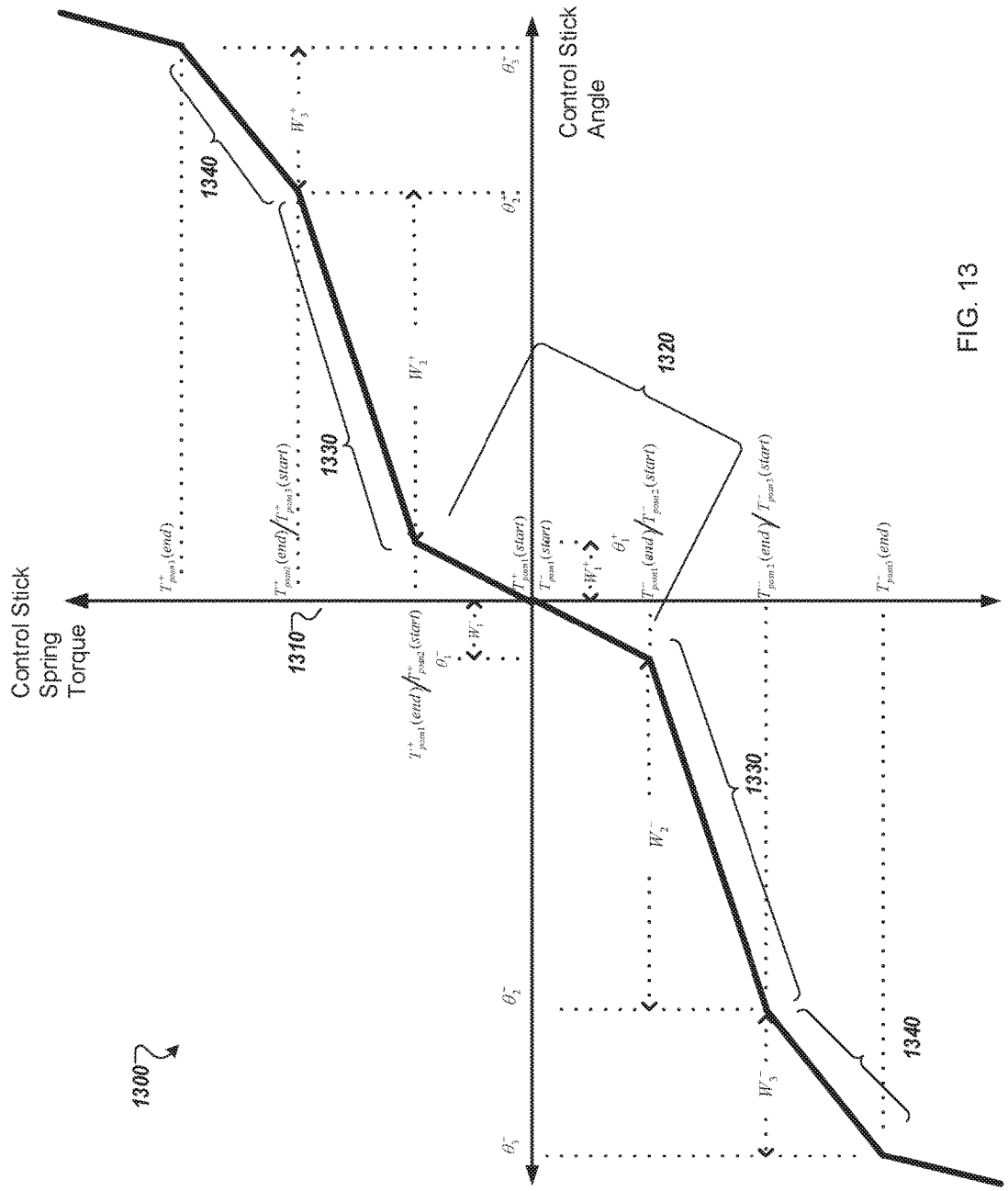
FIG. 13 is a graph of an example spring torque versus position curve.

Next, a cue enable signal 630 is determined based on the actuator position 601 and the cue position 602. The product of the cue enable signal 630 and the output of the position loop gain block 620 constitutes the torque command 336 for this one block. Referring to FIG. 13, each of the features is turned on by a corresponding cue enable signal 630 when the operator input nears that position. The net torque command to the current controller is the sum of the torque commands from each of the enabled blocks 520a-520d in FIG. 5.

Figure 7:
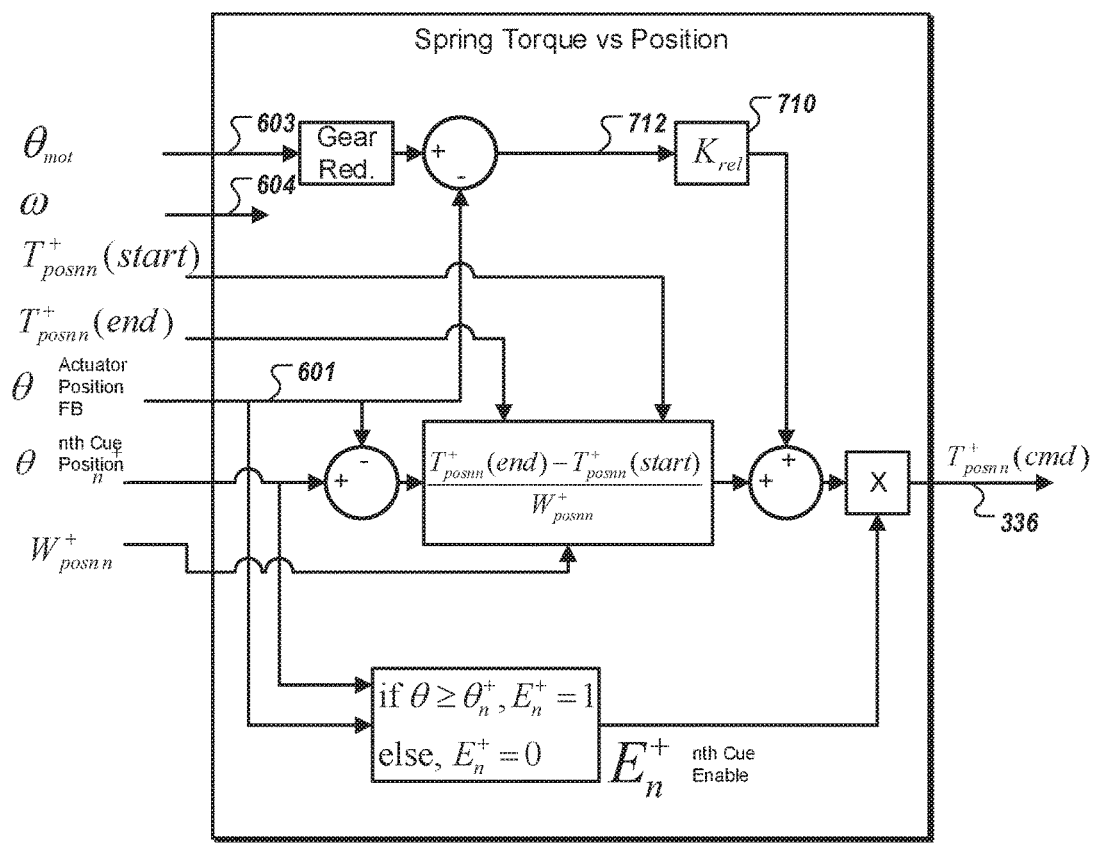
FIG. 7 is a block diagram of another example of a spring torque vs position functional block.

FIG. 7 is a block diagram of another example spring torque vs position functional block 700 of the cue control module 520a of FIG. 5. In some examples, the block 700 can be any of the functional blocks 520a-520d of FIG. 5. In some implementations, the spring torque vs position functional block 700 can be included in the example TCTA controller 250 of FIG. 2 instead of the example shown in FIG. 6. In comparison to the example shown in FIG. 6, the cue control module 700 adds a proportional torque command gain value 710 to an error value 712 between the actuator position 601 and the motor position 603 (e.g., as reflected to the actuator shaft). The error value 712 can be referred to as an actuator output value. In some implementations, this calculation can compensate for compliance in the gear-train 218.

Figure 8:
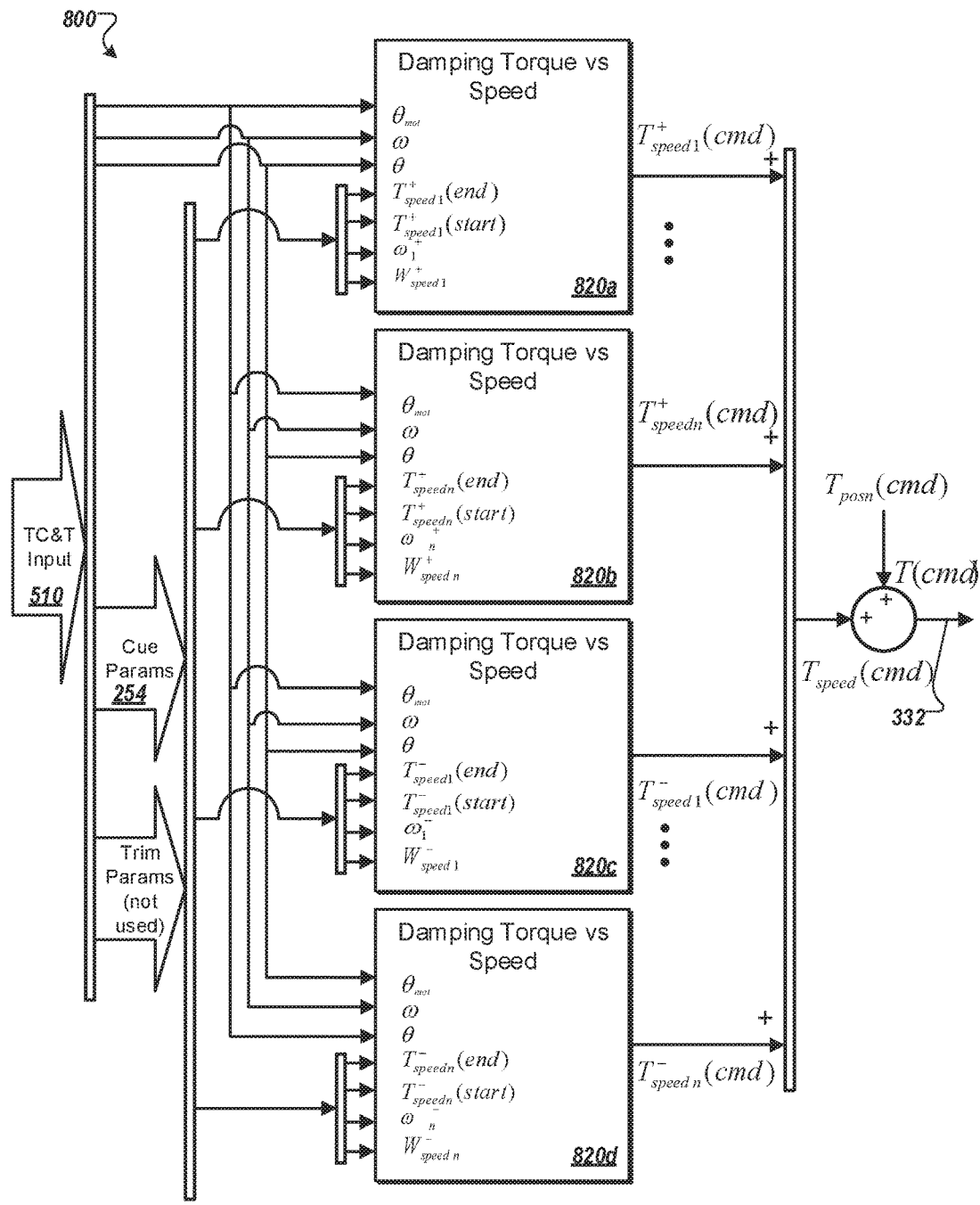
FIG. 8 is another block diagram of an example cue control speed module of the example tactile cue trim actuator control system.

FIG. 8 is a block diagram of an example cue control speed module 800. In some implementations, the cue control speed module 800 can be included in the example TCTA controller 250 of FIG. 2. In general, FIG. 8 shows a collection of functional blocks 820a-820d used in calculating the current corresponding to a speed-dependent damping force component of the collection of cue commands and parameters 254.

The tactile cue and trim control input 510 is used by each of the functional blocks 820a-820d to calculate a component of the damping torque command. Each of these functional blocks 820a-820d corresponds to a feature in the torque versus speed characteristic illustrated by FIG. 15.

Figure 9:
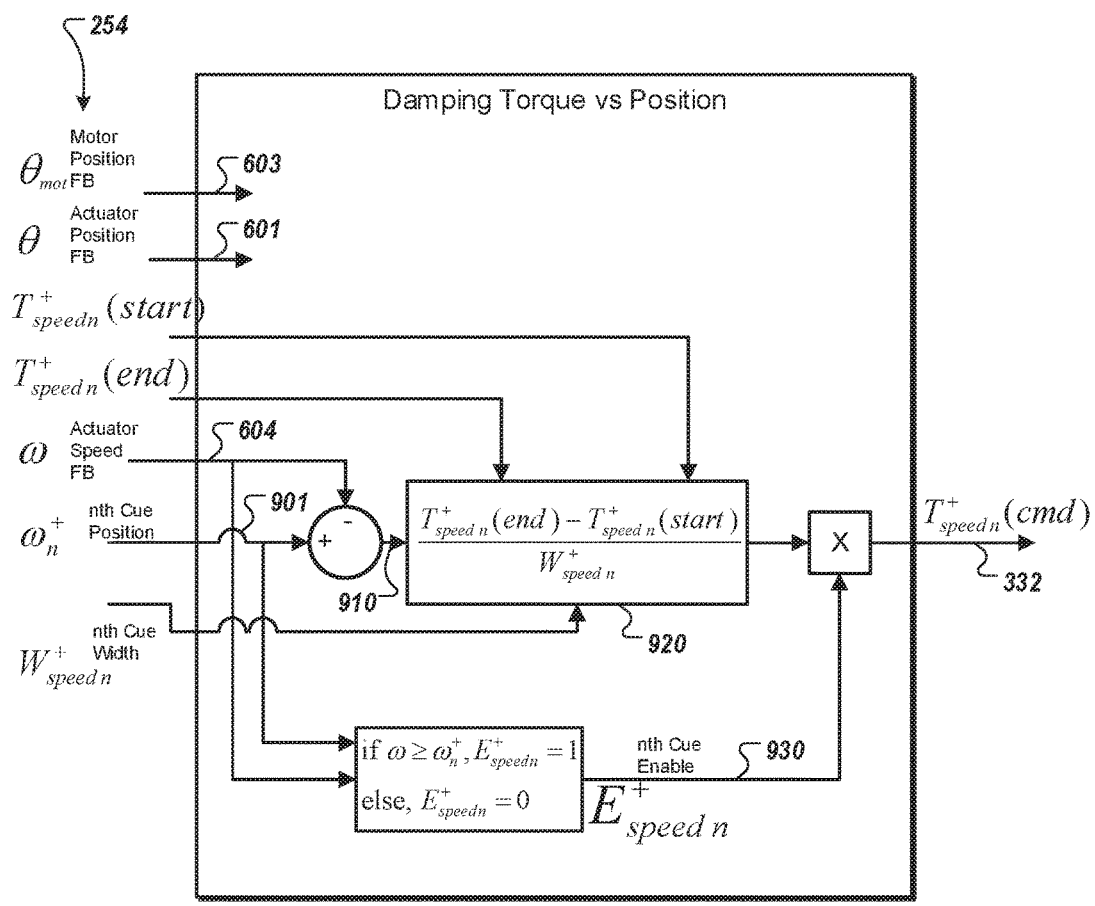
FIG. 9 shows additional detail of a damping torque versus speed functional block.

FIG. 9 shows detail of an example damping torque vs speed functional block 900. In some examples, the block 900 can be any of the functional blocks 820a-820d of FIG. 8. In general, FIG. 9 illustrates the functional blocks used in determining the current corresponding to the damping force component of the collection of cue commands and parameters 510.

In this process for calculating the component of damping torque, the motor position 603 and actuator position 604 are not used. A rate loop gain is calculated based on the default values for the collection of cue commands and parameters 254, or on values provided by the operator. A rate loop error value 910 is determined by taking the difference between the actuator speed 604 and a cue speed parameter 901. The rate loop error value 910 is multiplied by a rate loop gain determined by a rate loop gain block 920.

A cue enable signal 930 is determined based on the actuator speed 604 and the cue speed 901 parameters. The product of the enable signal 930 and the output of the gain block constitutes the torque command 332 for this one block. Referring to FIG. 13, each of the features is turned on by a corresponding cue enable signal 930 when the operator input nears that speed. The net torque command to the current controller 240 is the sum of the torque commands 332 from each of the enabled blocks 820a-820d.

Figure 10:
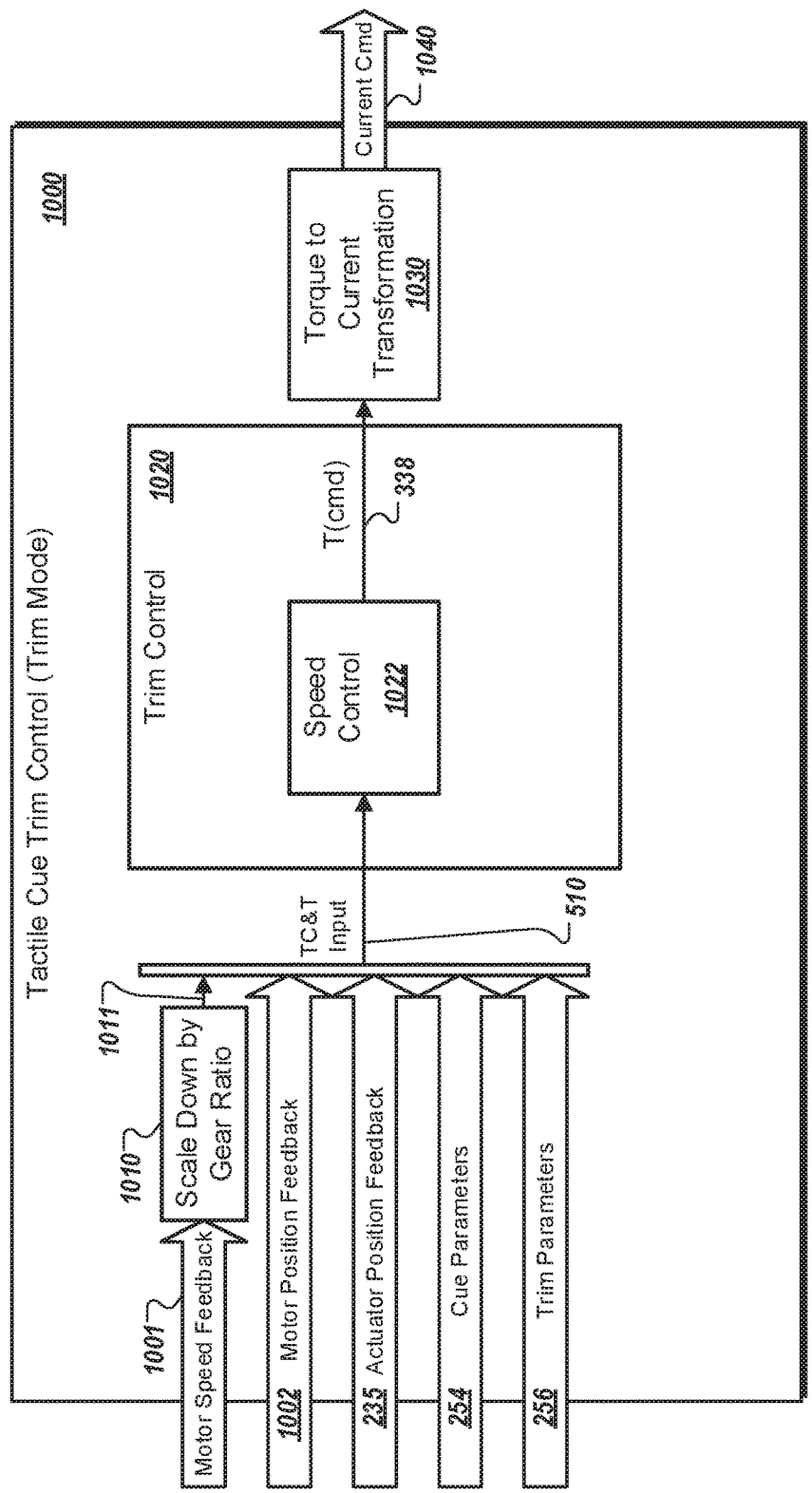
FIG. 10 is a block diagram of an example trim control module of the example tactile cue trim actuator control system.

FIG. 10 is a block diagram of an example trim control module 1000 of the example TCTA controller 250 if FIG. 2. In general, FIG. 10 shows the functional blocks used in calculating the current command in when the TCTA controller 250 is operating in a trim mode.

The collection of trim commands and parameters 256 are obtained from the operator interface. The trim control module 1000 receives a motor speed feedback signal 1001 and scales that using a gear ratio 1010 to estimate an actuator speed value 1011. A motor position feedback signal 1002 is not used. The actuator position feedback signal 235 is obtained from the resolver to digital converter 234. These inputs are used by a speed controller 1022 to generate a torque command 338. The torque command 338 is converted to a current command 1040 by the torque-to-current transformation module 1030. The module 1030 uses a motor torque constant, information regarding the gear-train 218, information about the efficiency of the motor 210 to calculate the motor current.

Figure 11:
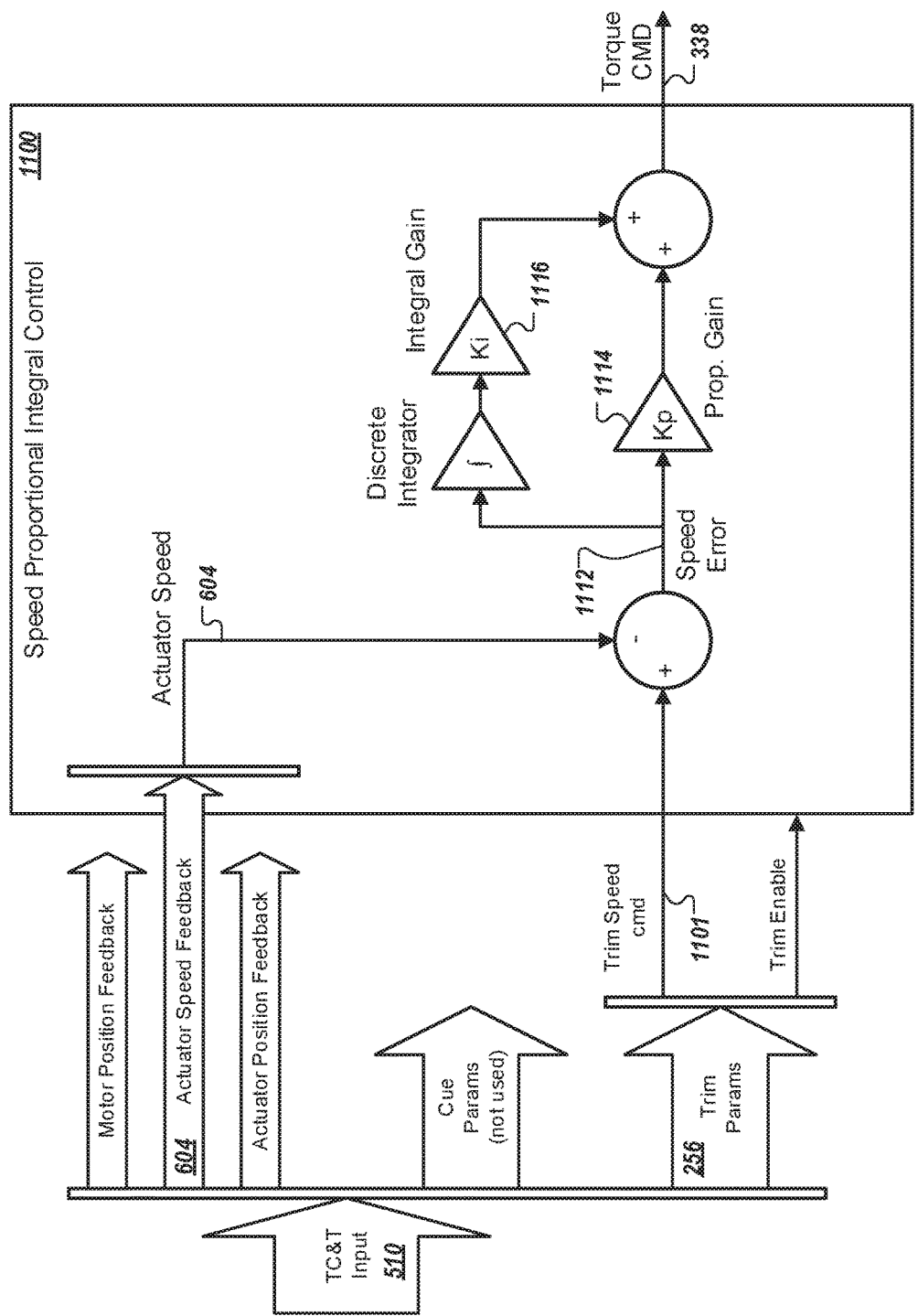
FIG. 11 shows additional detail of the example trim control module.

FIG. 11 shows additional detail of the example trim control module 1020 of FIG. 10. In general, FIG. 11 shows the functional blocks used to implement a PI controller 1100 for the trim mode.

A trim speed command 1101 is received from the operator interface (e.g., as part of the collection of trim commands and parameters 256). In some implementations, the trim speed command 1101 can be a set of discrete values or a set of continuously varying values. A speed error value 1112 is determined by taking the difference between the trim speed command 1101 and the actuator speed 604. The speed error value 1112 is then processed to determine a proportional gain value 1114 and an integral gain value 1116, which are then summed to determine the torque command value 338.

Figure 12:
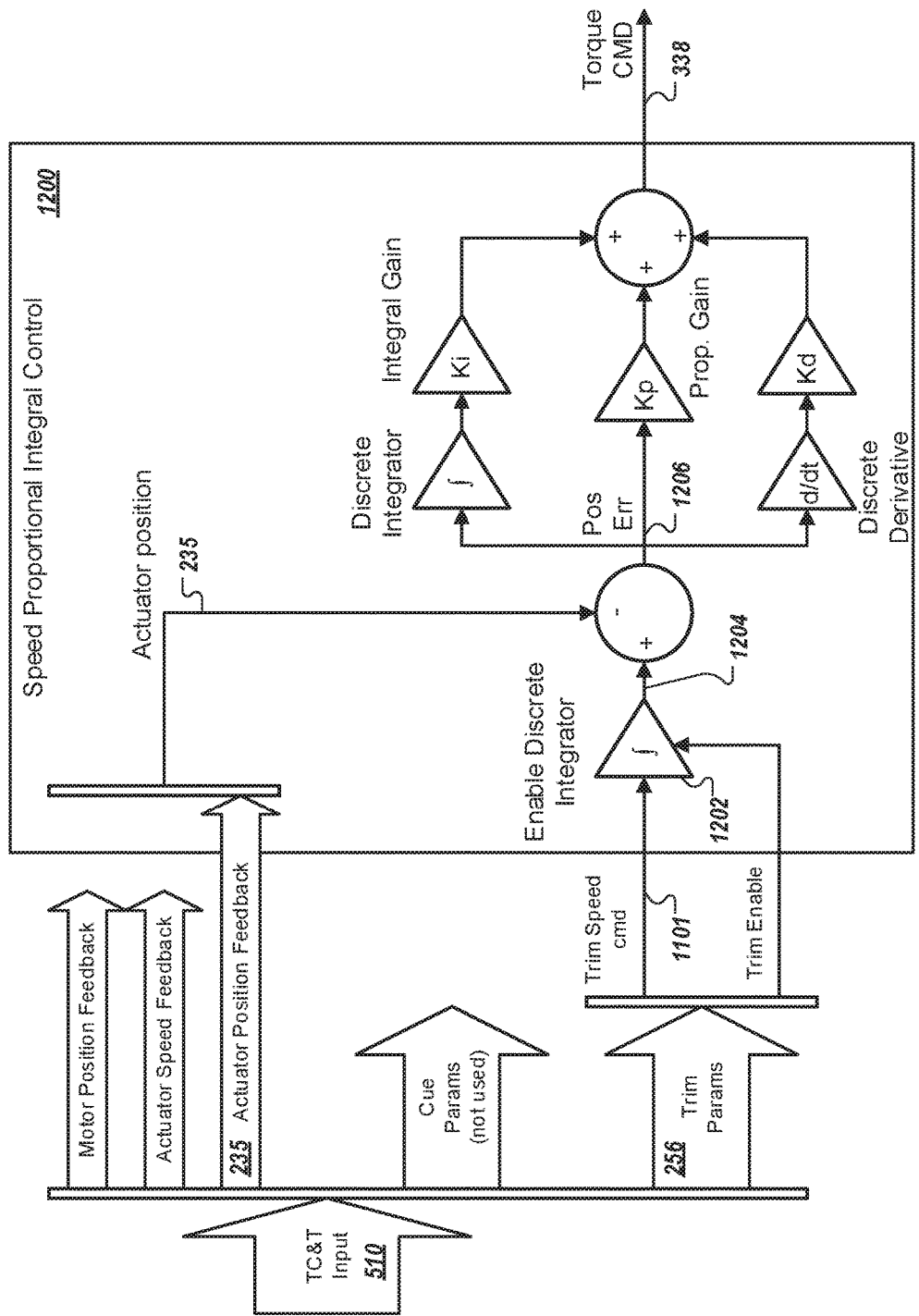
FIG. 12 is a block diagram of another example of the trim control module.

FIG. 12 is a block diagram of another example of the trim control module 1020 of FIG. 10. In general, FIG. 12 shows the functional blocks used to implement another PI controller 1200 for the trim mode. Compared to the example PI controller 1100 of FIG. 11, the PI controller 1200 uses the position feedback signal 235 instead of speed feedback signal 604.

The trim speed command 1101 received from the operator is integrated 1202 with respect to time to obtain a position command profile 1204. The integration is synchronized with the beginning of the trim mode. A position error 1206 is then determined and this is processed by a proportional-integral-derivative PID controller to obtain the torque command 338. In some implementations, this technique may be useful when the speed feedback signal 604 is not available.

FIG. 13 is a graph 1300 of an example spring torque versus position curve 1310. The curve 1310 shows an example relationship between operator input or actuator load torque as a function of the operator input or actuator position. A region 1320 of the curve 1310 near the origin represents a breakout torque characteristic. This characteristic serves to center operator input about a neutral position (e.g., a stick center position). The next regions 1330 represent spring forces that provides a torque proportional to the actuator position. The next regions 1340 have steeper gradients, and in some examples could represent a soft-stop.

Figure 14:
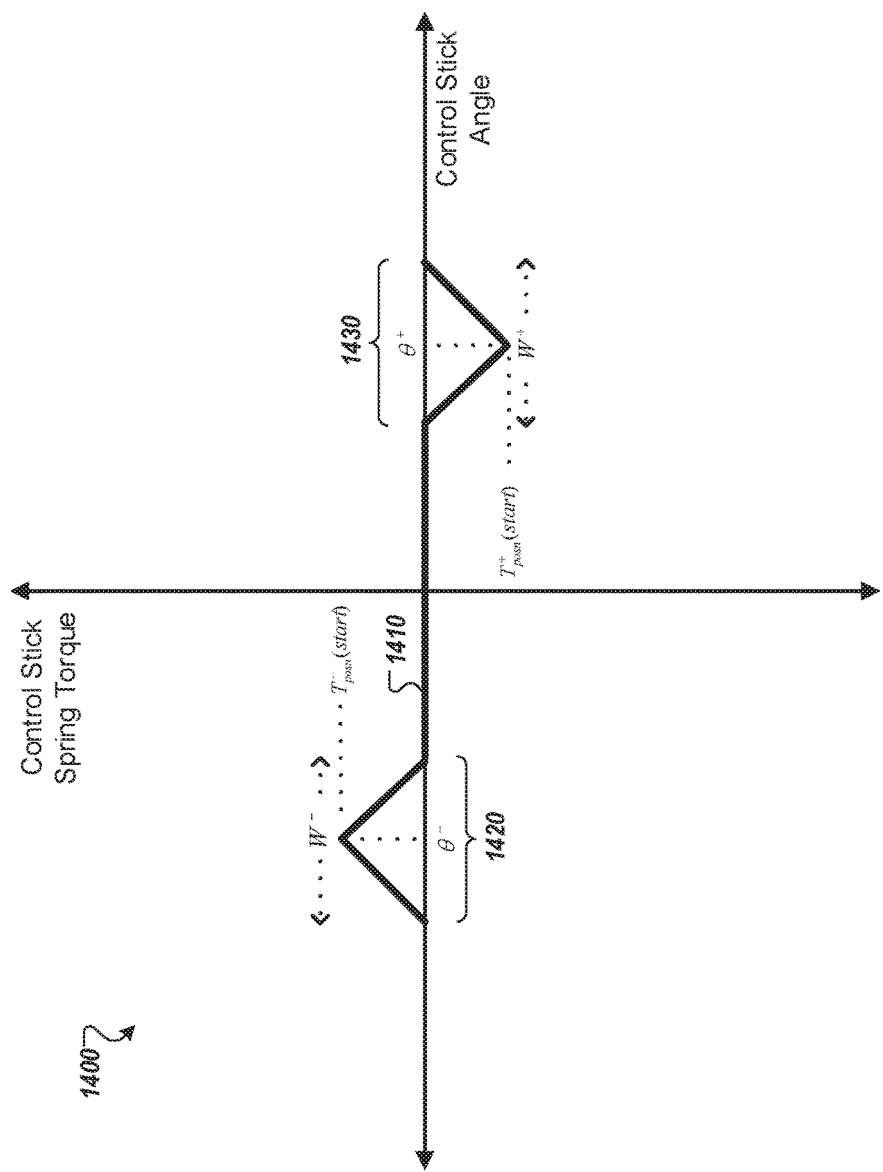
FIG. 14 is a graph of an example detent torque versus position curve.

FIG. 14 is a graph 1400 of an example detent torque versus position curve 1410. The curve 1410 represents an example relationship between operator input or actuator torque as a function of the operator input or actuator position that implements a detent feature. The detents are simulated by altering the torque provided at the operator input when the operator input or the actuator position enters a region 1420 or 1430.

Figure 15:
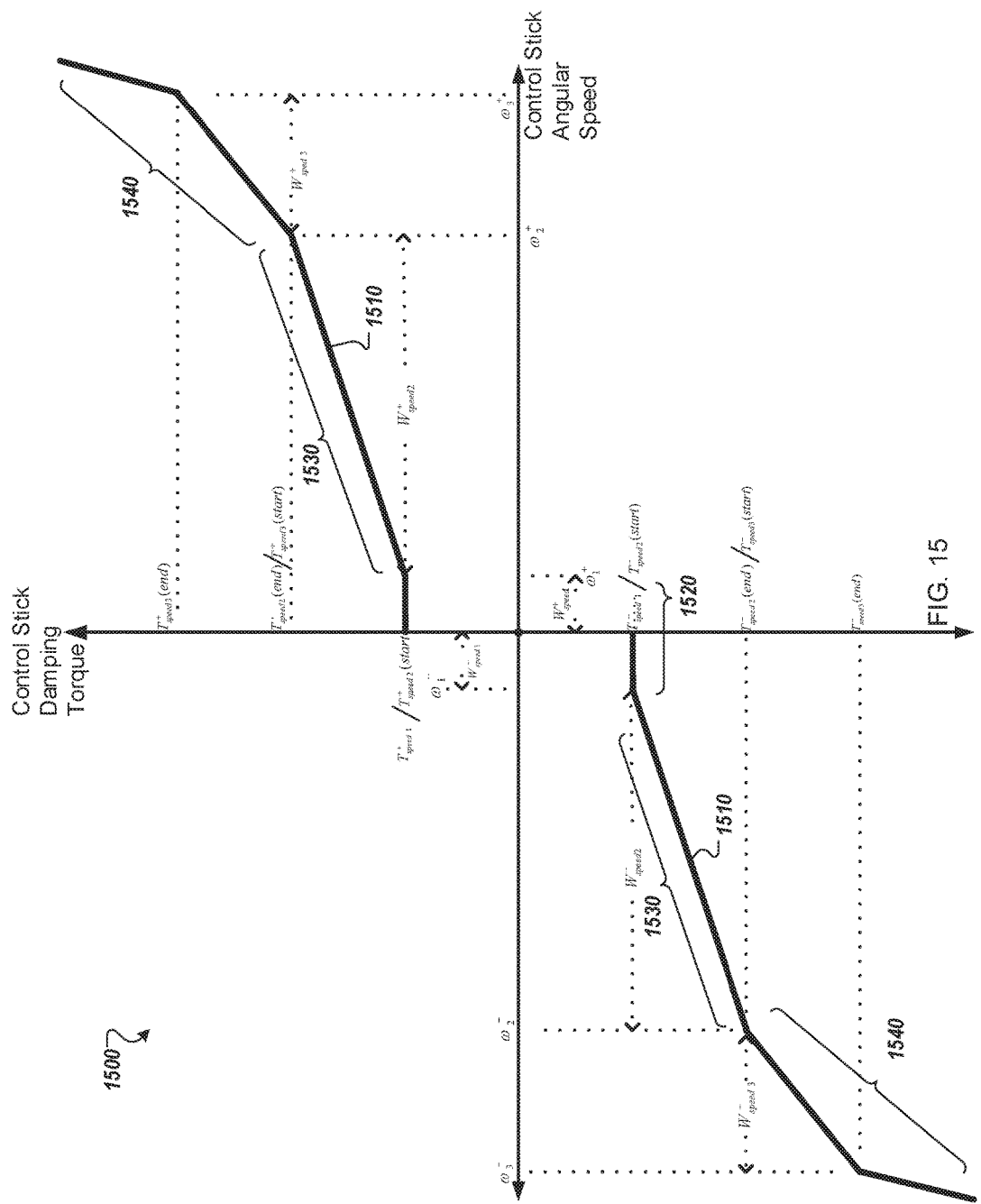
FIG. 15 is a graph of an example damping torque versus speed curve.

FIG. 15 is a graph 1500 of an example damping torque versus speed curve 1510. The curve 1510 represents an example of the relationship between the resistive torque desired from the actuator as a function of the actuator speed. A region 1520 of the graph 1500 near the origin represents a constant damping torque characteristic. The next regions 1530 represent a proportional damping torque that provides a torque proportional to the actuator speed. The next regions 1540 have steeper gradients, and could represent a soft-stop in some examples.

Figure 16:
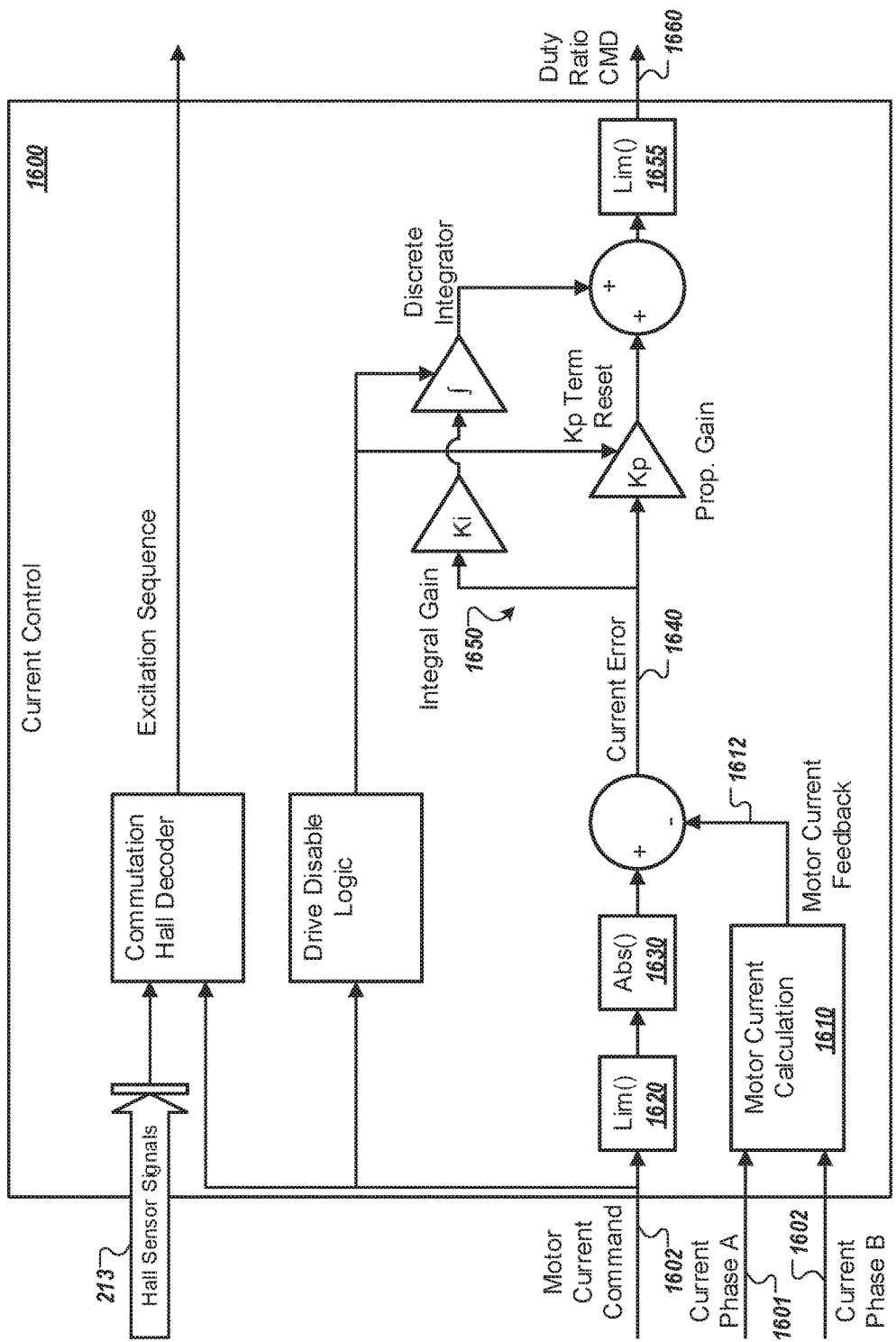
FIG. 16 is a block diagram of an example trapezoidal drive current control module of the example tactile cue trim actuator control system.

FIG. 16 is a block diagram of an example trapezoidal drive current control module 1600. In some embodiments, the current control module 1600 can be the current control module 240 of the example TCTA system of FIG. 2.

A motor phase A current signal 1601 and a motor phase B current signal 1602 from the current sensors 232 are used by a motor current module 1610 to calculate an absolute value of the instantaneous motor line current 1612. A motor current command 1602 from the outer loop controllers (e.g., current command 342 of FIG. 3 or the current command 1040 of FIG. 10) is limited 1620 and its absolute value calculated 1630. A current error 1640 between the current command 1602 and the motor line current 1612 is then processed by a proportional-integral controller 1650 which outputs a voltage duty ratio command 1660. This is limited 1655 to the range available on the electronic bus. The drive disable logic block produces a disable signal when the motor current command changes sign. This is discussed further in the description of FIG. 18. Both the integral term and the proportional term are zeroed by the drive disable signal when it is TRUE. The excitation sequence to the gate drivers is calculated by the commutation Hall sensor decoder module, which is discussed further in the description of FIG. 17.

Figure 17:
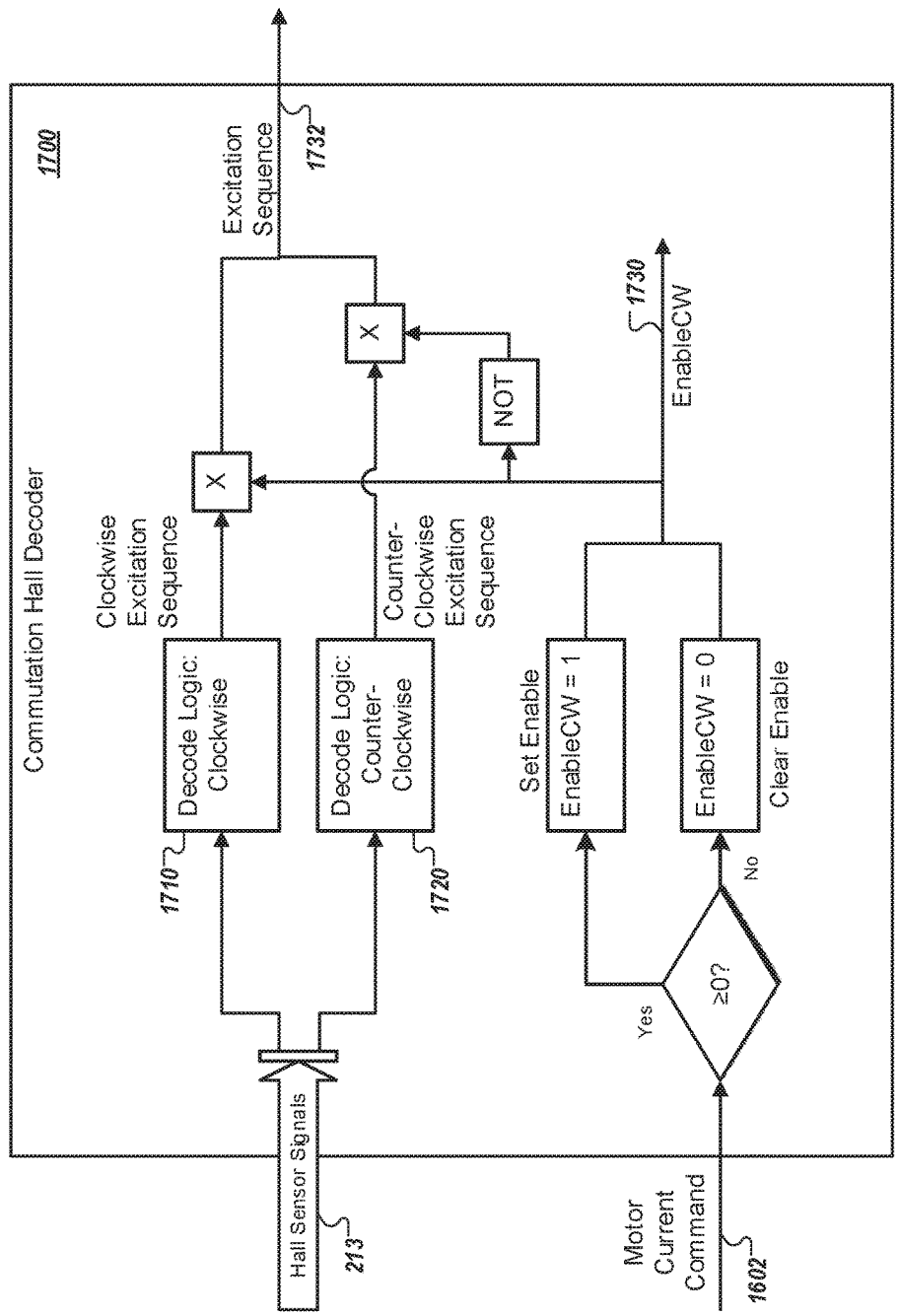
FIG. 17 is a block diagram of an example commutation Hall decoding process of the example tactile cue trim actuator control system.

FIG. 17 is a block diagram of an example commutation Hall sensor decoder module 1700 (e.g., a block commutation logic module) of the example tactile cue trim actuator control system 200. In some implementations, the module 1700 can be part of the example TCTA controller 250 of FIG. 2.

The commutation Hall sensor signals 213 are decoded by a clockwise decode logic block 1710 for clockwise rotation and by a counter-clockwise decode logic block 1720 for counter-clockwise rotation. In some examples, this logic is called Trap drive or block commutation. The sign of the motor current command 1602 is used to determine the desired direction of rotation 1730 and an excitation sequence 1732 and this enables one or the other of the excitation sequences from the decode logic blocks.

Figure 18:
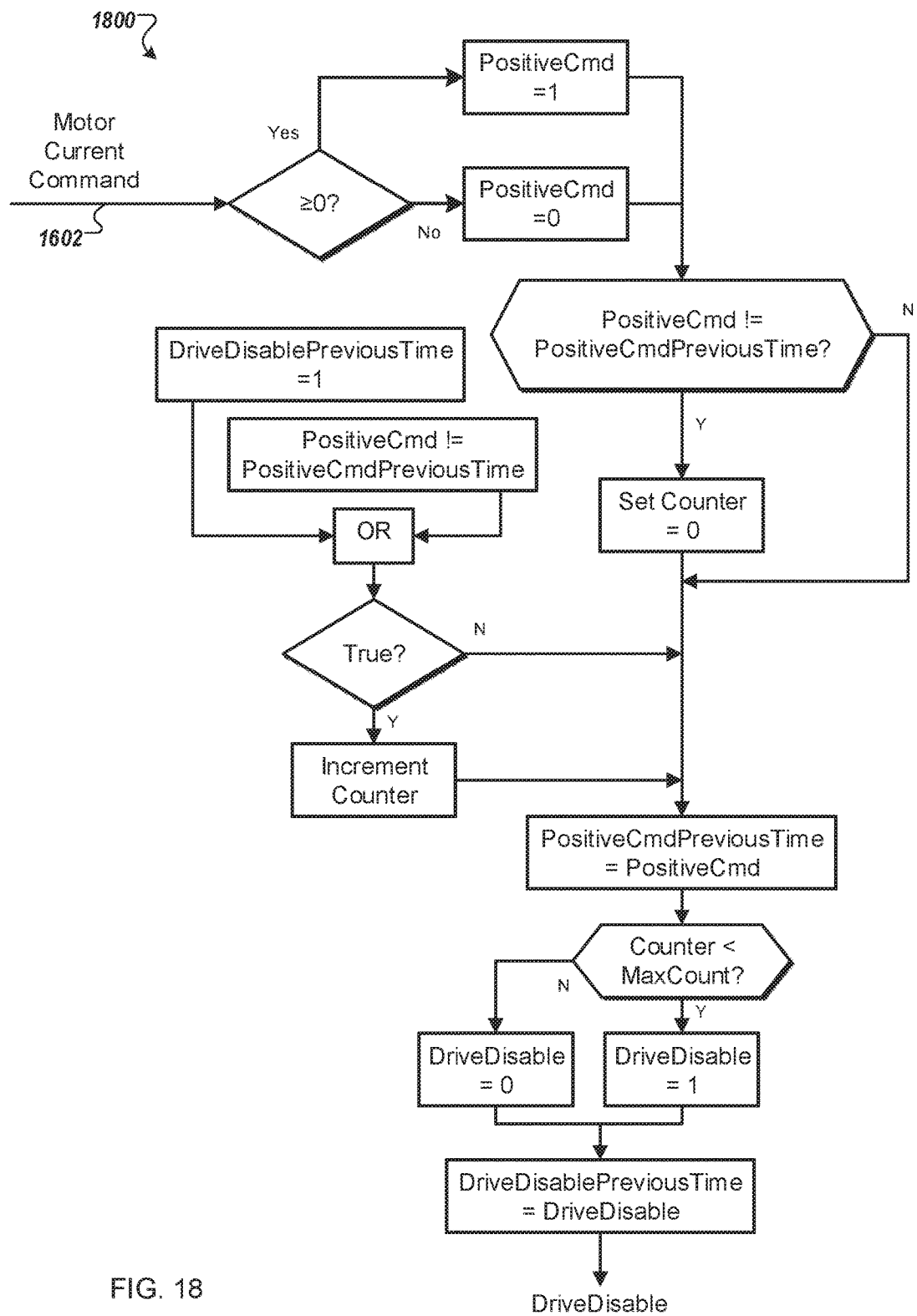
FIG. 18 is a block diagram of an example drive disable process of the example tactile cue trim actuator control system.

FIG. 18 is a block diagram of an example drive disable process 1800 of the example TCTA system 200 of FIG. 2. The process 1800 shows an example set of steps used to generate a motor disable signal. Whenever the motor current command 1602 changes sign, the motor drive is disabled for a short interval during which time the integral term and the proportional term of the PI controller are reset to zero. In some examples, this can be used to prevent regenerative action of the motor 210.

Figure 19:
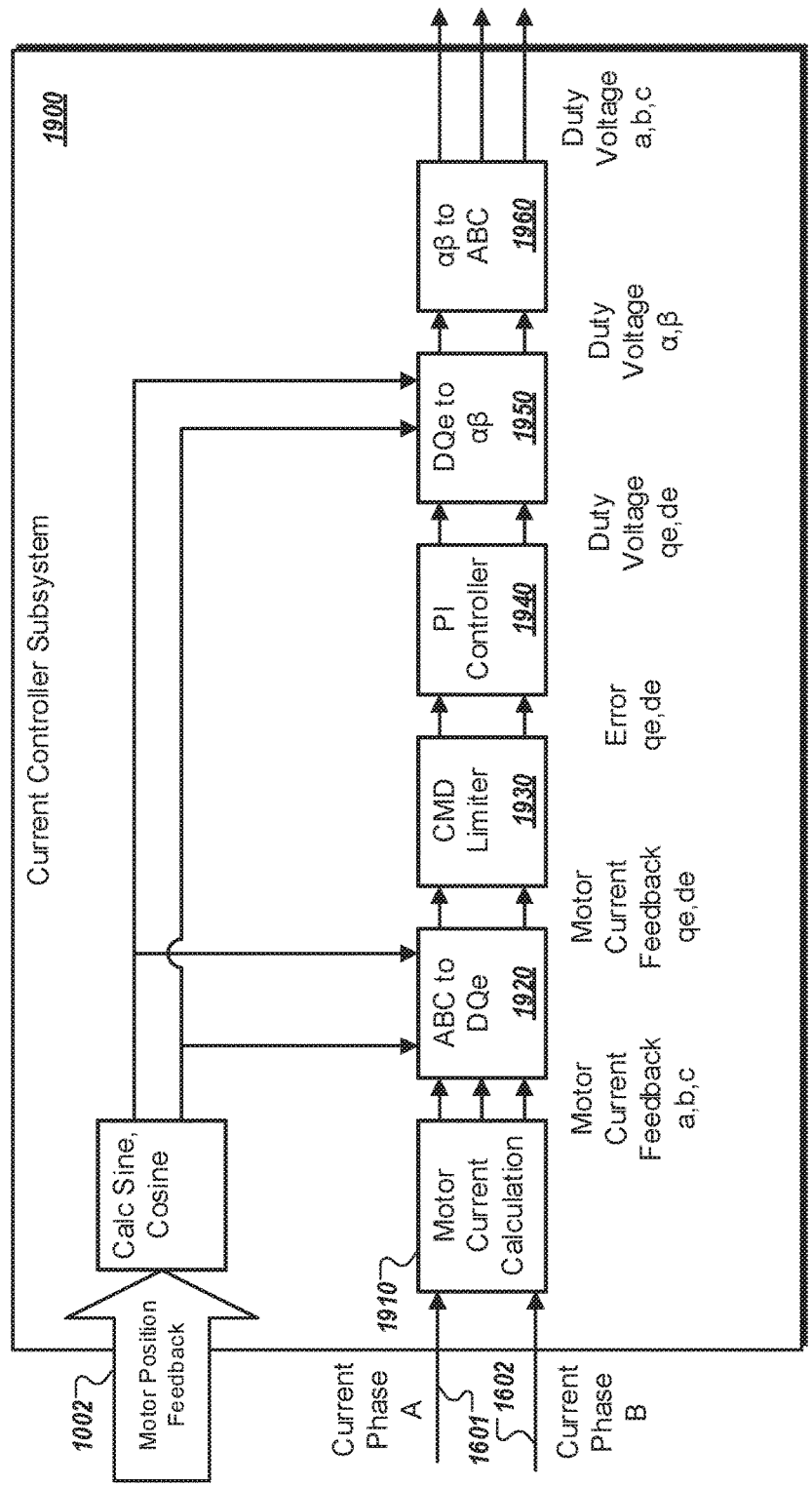
FIG. 19 is a block diagram of an example vector drive current control module of the example tactile cue trim actuator control system.

FIG. 19 is a block diagram of an example vector (sine) drive current control module 1900 of the example TCTA controller 250 of FIG. 2. In general, FIG. 19 shows an example collection of functional blocks that can be used to implement a low resolution vector control drive for the motor 210.

The details of typical vector drive current controls are known in the practice of motor drives. What is unique about the vector drive current control module 1900 is that it is being used with the discrete motor position feedback signal 1002 instead of a continuous motor position feedback (e.g., as would be obtained from a resolver). In some implementations, the vector drive control module 1900 can exhibit comparatively less torque ripple than a block commutated drive, and/or can be relatively easier to implement four-quadrant current control that includes regenerative operation.

The motor phase A current signal 1601 and the motor phase B current signal 1602 from the current sensors 232 are used to estimate 1910 the current in phase C, using the fact that the sum of all three phase currents is substantially equal to zero. These currents are transformed 1920 to the DQ coordinate system into q-axis and the d-axis components. The motor current command from the outer loop controller is the q-axis current command (e.g., the d-axis current command is selected to be zero in this example). This signal is limited in a CMD Limiter block 1930 to prevent a motor over-torque condition. The block 1930 also calculates an error between the q-axis current command and the q-axis current feedback. The error between the current command and current feedback is then processed by a proportional-integral controller 1940 which outputs a voltage duty ratio in the DQ coordinate system. The duty ratio is then transformed to (alpha, beta) quadrature components of the stationary coordinate system by the block 1950 called "DQe to αβ". In order to increase bus voltage utilization, a space vector modulation (SVM) is used to calculate the actual on-time for the gate drive PWM signals. This is done by the block 1960, called "αβ to ABC".

Figure 20:
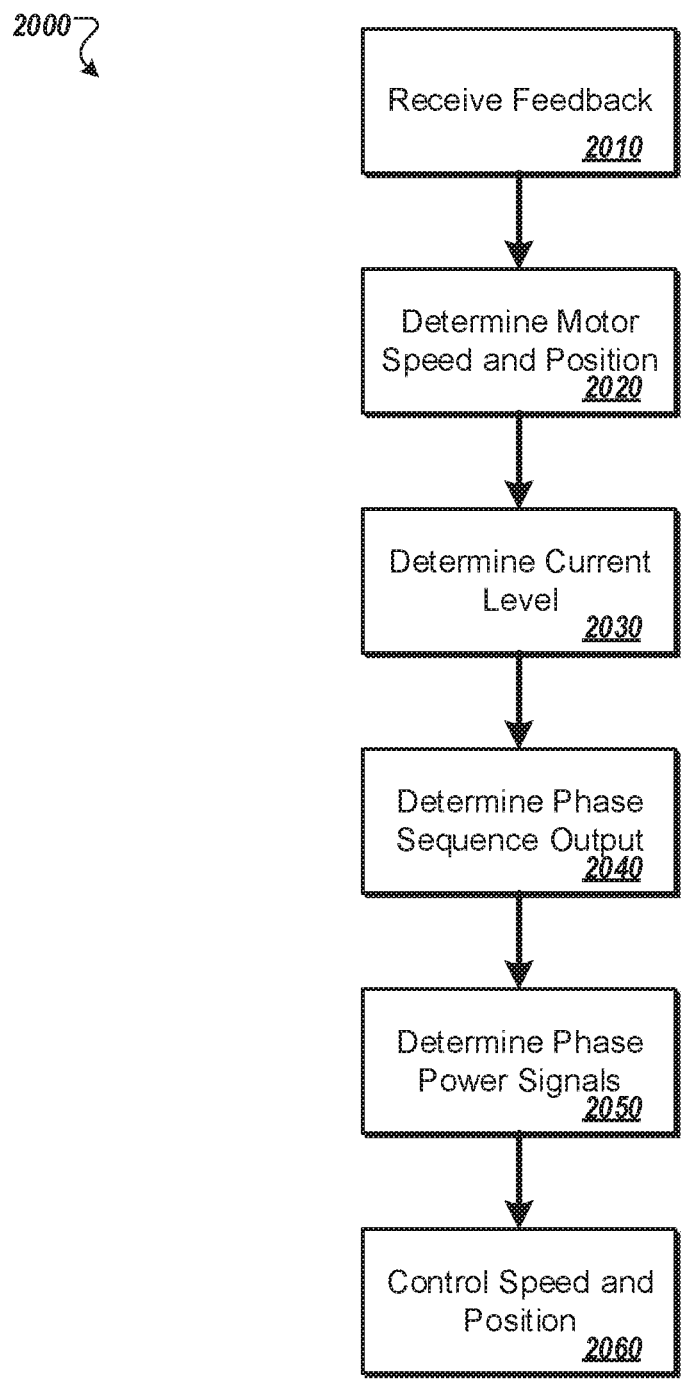
FIG. 20 is a flow diagram of an example process for tactile cue trim actuator control.

FIG. 20 is a flow diagram of an example process 2000 for tactile cue trim actuator control. In some implementations, the process 2000 may be performed by the example TCTA system 200 of FIG. 2.

At 2010, a collection of feedback signals from a brushless DC motor, a control input signal based on a position of a control input member, and a feedback signal based on a position of the mechanical output are received. In some implementations, the control input signal can be a position feedback signal based on the position of an actuator driven by the mechanical output. For example, the TCTA controller 250 receives the commutation Hall sensor signals 213 and the auxiliary Hall sensor signals 215 from the motor 210, the collection of cue commands and parameters 254, the collection of trim commands and parameters 256, and the actuator position feedback signal 235.

At 2020 a motor speed and a motor position of the brushless DC motor are determined. For example, the example auxiliary Hall decoder module 400 of FIG. 4 uses the collection of commutation Hall sensor signals 213 and the collection of auxiliary Hall sensor signals 215 to determine the actuator speed and direction 401 and the motor position 462, and this information is provided to the current control module 240.

At 2030, an electrical current level is determined based on the control input signal, the motor speed, and the motor position. For example, the TCTA controller 250 determines a current control command 342 and/or 1040 that is provided to the current control module 240.

At 2040, a collection of electrical phase sequence output signals is determined based on the determined electrical current level. For example, the current controller 240 receives the current control commands 342 and/or 1040 and coordinates a collection of commands to drive the power stage H-bridge 230.

At 2050, a collection of phase power signals is determined based on the collection of electrical phase sequence output signals. For example, the power stage H-bridge 230 can respond to the commands from the current controller 240 by providing phase power signals to the motor 210.

At 2060, the speed and position of a mechanical output of the brushless DC motor are controlled based on the plurality of phase power output signals. For example, as the motor 210 rotates, the gear train 218, the EM clutch 224, and the actuator output 222 are also rotated.

In some implementations, the electrical current level can be determined based on a cue control mode in which the electrical current level is controlled to provide haptic feedback at a mechanical control input that emulates one or more of a mechanical detent, a mechanical breakout, a spring bias, and a soft stop. For example, the process 2000 can emulate the biases illustrated in FIG. 13 and/or the detents illustrated in FIG. 14.

In some implementations, the process 2000 can also include determining the electrical current level based on a trim control in which the electrical current level is controlled to move the control input member and actuate the motor. For example, the TCTA controller 300 of FIG. 3 can provide the current command 342, or the TCTA controller 1000 of FIG. 10 can provide the current command 1040, to emulate the example spring torque versus position curve 1310 of FIG. 13, the example detent torque versus position curve 1410 of FIG. 14, and/or the example damping torque versus speed curve 1510 of FIG. 15.

In some implementations, the process 2000 can also include determining, by a block commutation logic module, a collection of motor phases of the motor to be excited based on the first feedback signals, and regulating, by a proportional integral (PI) controller, the amount of electrical current provided to the collection of motor phases. For example, the commutation Hall sensor decoder module 1700 of FIG. 17 can determine the excitation sequence 1732, and the PI controller 1100 of FIG. 11 or the PI controller 1200 of FIG. 12 can be used determine the torque command 338.

In some implementations, the process 2000 can also include determining, by a motor position module, a position of the motor based on the sensed position and the sensed motor speed and the sensed motor position, transforming, by a first coordinate transformation module, electrical phase sequence output signals from a stationary frame of reference to a rotor frame of reference based on the first feedback signals, determining, by a proportional integral (PI) controller, a plurality of motor phase voltages based on a plurality of determined closed loop errors in motor currents in the rotor frame of reference, and transferring, by a second coordinate transformation module, the motor phase voltages to the three phase quantities in the stationary frame of reference based on the first feedback signals. For example, the vector drive current control module 1900 can implement the "αβ to ABC" block 1960 to perform a space vector modulation (SVM) to calculate the actual on-time for the gate drive PWM signals based on the motor phase A current signal 1601 and the motor phase B current signal 1602 from the current sensors 232.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A motion control apparatus comprising:
  a brushless DC motor configured to actuate a mechanical device based on a plurality of phase power signals;
  a plurality of first Hall effect sensors configured to provide a plurality of first feedback signals in response to a sensed motor position;
  a plurality of second Hall effect sensors configured to provide a plurality of second feedback signals in response to a sensed motor speed;
  a controller configured to (A) determine a motor speed and a motor position of the brushless DC motor based on the plurality of feedback signals, and (B) determine an electrical current level based on a collection of operational parameters and feedback signals comprising a position of the mechanical device, the motor speed, and the motor position;
  a current controller configured to provide a plurality of electrical phase sequence output signals based on the electrical current level; and
  a motor driver configured to provide the plurality of phase power signals based on the plurality of electrical phase sequence output signals.

2. The motion control apparatus of claim 1, wherein the control input signal is a position feedback signal based on the position of the mechanical device.

3. The motion control apparatus of claim 1, further comprising a clutch configured to controllably disconnect the mechanical device from the brushless DC motor.

4. The motion control apparatus of clam 1, further comprising a bias member configured to bias the mechanical device toward a predetermined position.

5. The motion control apparatus of claim 1, wherein the controller is further configured to determine the electrical current level based on a cue control mode in which the electrical current level is controlled to provide haptic feedback at a mechanical control input that emulates one or more of a mechanical detent, a mechanical breakout, a spring bias, and a soft stop.

6. The motion control apparatus of clam 1, wherein the controller is further configured to determine the electrical current level based on a trim control in which the electrical current level is controlled to move the control input member and actuate the motor.

7. The motion control apparatus of claim 1, wherein the controller is a trapezoidal drive current controller comprising:
  a block commutation logic module configured to determine a collection of motor phases of the motor to be excited based on the first feedback signals; and
  a proportional integral (PI) controller configured to regulate the amount of electrical current provided to the collection of motor phases.

8. The motion control apparatus of claim 1, wherein the controller is a vector drive current controller comprising:
  a motor position module configured to determine a position of the motor based on the sensed position and the sensed motor speed and the sensed motor position;
  a first coordinate transformation module that transforms electrical phase sequence output signals from a stationary frame of reference to a rotor frame of reference based on the first feedback signals;
  a proportional integral (PI) controller configured to determine a plurality of motor phase voltages based on a plurality of determined closed loop errors in motor currents in the rotor frame of reference; and
  a second coordinate transformation module configured to transfer the motor phase voltages to the three phase quantities in the stationary frame of reference based on the first feedback signals.

9. A method for providing haptic feedback, the method comprising:
receiving a plurality of feedback signals from a brushless DC motor and a control input signal based on a position of a control input member;
determining a motor speed and a motor position of the brushless DC motor;
determining an electrical current level based on the control input signal, the motor speed, and the motor position;
determining a plurality of electrical phase sequence output signals based on the determined electrical current level;
determining a plurality of phase power signals based on the plurality of electrical phase sequence output signals; and
controlling the speed and position of a mechanical device driven by a mechanical output of the brushless DC motor based on the plurality of phase power signals.

10. The method of claim 9, wherein the control input signal is a position feedback signal based on the position of the mechanical device driven by the mechanical output.

11. The method of claim 9, further comprising determining the electrical current level based on a cue control mode in which the electrical current level is controlled to provide haptic feedback at a mechanical control input that emulates one or more of a mechanical detent, a mechanical breakout, a spring bias, and a soft stop.

12. The method of claim 9, further comprising determining the electrical current level based on a trim control in which the electrical current level is controlled to move the control input member and actuate the motor.

13. The method of claim 9 further comprising:
determining, by a block commutation logic module, a collection of motor phases of the motor to be excited based on the plurality of feedback signals; and
regulating, by a proportional integral (PI) controller, the amount of electrical current provided to the collection of motor phases.

14. The method of claim 9 further comprising:
determining, by a motor position module, a position of the motor based on a sensed position of the mechanical output, the sensed motor speed, and the sensed motor position;
transforming, by a first coordinate transformation module, electrical phase sequence output signals from a stationary frame of reference to a rotor frame of reference based on the plurality of feedback signals;
determining, by a proportional integral (PI) controller, a plurality of motor phase voltages based on a plurality of determined closed loop errors in motor currents in the rotor frame of reference; and
transferring, by a second coordinate transformation module, the motor phase voltages to the three phase quantities in the stationary frame of reference based on the plurality of feedback signals.

15. A motion controller comprising:
a data processing apparatus;
a plurality of electrical inputs configured to receive a control input signal and a plurality of Hall effect sensor feedback signals;
an electrical output configured to provide an electrical current level; and
a non-transitory memory device storing instructions that when executed, cause the data processing apparatus to perform operations comprising:
receiving a plurality of feedback signals from a brushless DC motor and a control input signal based on a position of a control input member, and a feedback signal based on a position of a mechanical device driven by a mechanical output of the brushless DC motor;
determining a motor speed and a motor position of the brushless DC motor;
determining an electrical current level based on the control input signal, the motor speed, and the motor position;
determining a plurality of electrical phase sequence output signals based on the determined electrical current level;
determining a plurality of phase power signals based on the plurality of electrical phase sequence output signals;
controlling the speed and position of the mechanical output of the brushless DC motor based on the plurality of phase power signals.

16. The motion controller of claim 15, wherein the control input signal is a position feedback signal based on the position of the mechanical device driven by the mechanical output.

17. The motion controller of claim 15, further comprising a clutch configured to controllably disconnect the mechanical device from the brushless DC motor.

18. The motion controller of clam 15, further comprising a bias member configured to bias the mechanical device toward a predetermined position.

19. The motion controller of claim 15, wherein the controller is further configured to determine the electrical current level based on a cue control mode in which the electrical current level is controlled to provide haptic feedback at a mechanical control input that emulates one or more of a mechanical detent, a mechanical breakout, a spring bias, and a soft stop.

20. The motion controller of clam 15, wherein the controller is further configured to determine the electrical current level based on a trim control in which the electrical current level is controlled to move the control input member and actuate the motor.

21. The motion controller of claim 15, wherein the controller is a trapezoidal drive current controller comprising:
a block commutation logic module configured to determine a collection of motor phases of the motor to be excited based on the first feedback signals; and
a proportional integral (PI) controller configured to regulate the amount of electrical current provided to the collection of motor phases.

22. The motion controller of claim 15, wherein the controller is a vector drive current controller comprising:
a motor position module configured to determine a position of the motor based on the sensed position and the sensed motor speed and the sensed motor position; a first coordinate transformation module that transforms electrical phase sequence output signals from a stationary frame of reference to a rotor frame of reference based on the first feedback signals;
a proportional integral (PI) controller configured to determine a plurality of motor phase voltages based on a plurality of determined closed loop errors in motor currents in the rotor frame of reference; and a second coordinate transformation module configured to transfer the motor phase voltages to the three phase quantities in the stationary frame of reference based on the first feedback signals.

* * * * *

UNITED STATES PATENT AND TRADEMARK OFFICE
CERTIFICATE OF CORRECTION

PATENT NO. : 10,074,245 B2
APPLICATION NO. : 15/402497
DATED : September 11, 2018
INVENTOR(S) : Ganga P. Jayaraman et al.

Page 1 of 1

It is certified that error appears in the above-identified patent and that said Letters Patent is hereby corrected as shown below:

In the Claims

Column 14, Line 27, Claim 4, delete "clam" and insert --claim--.

Column 14, Line 37, Claim 6, delete "clam" and insert --claim--.

Column 16, Line 29, Claim 18, delete "clam" and insert --claim--.

Column 16, Line 40, Claim 20, delete "clam" and insert --claim--.

Signed and Sealed this
Fifteenth Day of January, 2019

Andrei Iancu
*Director of the United States Patent and Trademark Office*